United States Patent
Sridharan et al.

(10) Patent No.: US 8,762,322 B2
(45) Date of Patent: Jun. 24, 2014

(54) DISTRIBUTED ORDER ORCHESTRATION SYSTEM WITH EXTENSIBLE FLEX FIELD SUPPORT

(75) Inventors: Sarita Sridharan, Fremont, CA (US); Venkatesh Malapati, Frisco, TX (US); Srinivasan Vasudevan, Cupertino, CA (US); Maitrayee Bhoumik, Hyderabad (IN); Lalitha Kavuri, Fremont, CA (US); Nikhilkumar Parikh, Fremont, CA (US); Alok Singh, Fremont, CA (US); Sumeet Rijhsinghani, Fremont, CA (US); Balaji Parthasarathy Iyengar, Nashua, NH (US); Sasi Kala Erla, Hyderabad (IN); Raveesh Yadav, Hyderabad (IN); Krishna Raju Addala, Fremont, CA (US); Sunita Datti, San Ramon, CA (US); Nagaveena Raju, Foster City, CA (US); Gary Hallmark, Portland, OR (US)

(73) Assignee: Oracle International Corporation, Redwood Shores, CA (US)

( * ) Notice: Subject to any disclaimer, the term of this patent is extended or adjusted under 35 U.S.C. 154(b) by 181 days.

(21) Appl. No.: 13/477,591

(22) Filed: May 22, 2012

(65) Prior Publication Data
US 2013/0318029 A1 Nov. 28, 2013

(51) Int. Cl.
*G06F 17/00* (2006.01)
*G06N 7/00* (2006.01)
*G06N 7/08* (2006.01)

(52) U.S. Cl.
USPC ............................................. 706/59

(58) Field of Classification Search
USPC ............................................. 706/59
See application file for complete search history.

(56) References Cited

U.S. PATENT DOCUMENTS

| | | | |
|---|---|---|---|
| 4,044,337 A | 8/1977 | Hicks et al. | |
| 5,440,726 A | 8/1995 | Fuchs et al. | |
| 5,630,047 A | 5/1997 | Wang | |
| 5,761,499 A | 6/1998 | Sonderegger | |
| 5,768,586 A | 6/1998 | Zweben et al. | |
| 5,987,423 A | 11/1999 | Arnold et al. | |
| 5,996,088 A | 11/1999 | Frank et al. | |
| 6,053,948 A | 4/2000 | Vaidyanathan et al. | |
| 6,341,287 B1 | 1/2002 | Sziklai et al. | |
| 6,374,264 B1 | 4/2002 | Bohannon et al. | |
| 6,539,386 B1 | 3/2003 | Athavale et al. | |
| 6,567,783 B1 | 5/2003 | Notani et al. | |
| 6,601,233 B1 | 7/2003 | Underwood | |
| 6,698,018 B1 | 2/2004 | Zimniewicz et al. | |
| 6,876,977 B1 | 4/2005 | Marks | |
| 6,915,294 B1 | 7/2005 | Singh et al. | |
| 7,031,787 B2 | 4/2006 | Kalthoff et al. | |

(Continued)

OTHER PUBLICATIONS

ConceptWave Software Inc., "Order Management", Jul. 26, 2004.

(Continued)

*Primary Examiner* — Michael B Holmes
(74) *Attorney, Agent, or Firm* — Miles & Stockbridge P.C.

(57) ABSTRACT

A distributed order orchestration system publishes one or more newly generated artifacts that are generated as a result of generating one or more extensible flex fields to a rule dictionary. The distributed order orchestration system then imports the one or more newly generated artifacts within the rule dictionary as one or more facts. The distributed order orchestration system then creates one or more rules for the rule dictionary that references the one or more facts.

20 Claims, 11 Drawing Sheets

(56) References Cited

U.S. PATENT DOCUMENTS

| | | |
|---|---|---|
| 7,096,189 B1 | 8/2006 | Srinivasan |
| 7,139,841 B1 | 11/2006 | Somasundaram et al. |
| 7,356,482 B2 | 4/2008 | Frankland et al. |
| 7,379,903 B2 | 5/2008 | Caballero et al. |
| 7,441,187 B2 | 10/2008 | Meadows |
| 7,467,375 B2 | 12/2008 | Tondreau et al. |
| 7,469,219 B2 | 12/2008 | Goldberg |
| 7,472,374 B1 | 12/2008 | Dillman et al. |
| 7,546,257 B2 | 6/2009 | Hoffman et al. |
| 7,567,975 B2 | 7/2009 | Yalamanchi |
| 7,574,483 B1 | 8/2009 | Alger et al. |
| 7,590,680 B2 | 9/2009 | Fernando et al. |
| 7,627,867 B2 | 12/2009 | Banks |
| 7,657,534 B2 | 2/2010 | Kirkgaard |
| 7,664,750 B2 | 2/2010 | Frees et al. |
| 7,680,752 B1 | 3/2010 | Clune, III et al. |
| 7,680,782 B2 | 3/2010 | Chen et al. |
| 7,873,611 B2 | 1/2011 | Ebersole |
| 7,987,163 B2 | 7/2011 | Keshavarz-Nia et al. |
| 8,028,276 B1 | 9/2011 | Bessonov |
| 8,141,125 B2 | 3/2012 | Maes |
| 8,271,609 B2 * | 9/2012 | Addala et al. ............ 709/218 |
| 8,402,064 B2 * | 3/2013 | Addala et al. ............ 707/797 |
| 8,458,312 B2 | 6/2013 | Raghunathan et al. |
| 8,627,271 B2 * | 1/2014 | Reed et al. .............. 717/102 |
| 2002/0026339 A1 | 2/2002 | Frankland et al. |
| 2002/0042755 A1 | 4/2002 | Kumar et al. |
| 2002/0178014 A1 | 11/2002 | Alexander |
| 2002/0178074 A1 | 11/2002 | Bloom |
| 2003/0078933 A1 | 4/2003 | Gara et al. |
| 2003/0078944 A1 | 4/2003 | Yamauchi et al. |
| 2003/0172007 A1 | 9/2003 | Helmolt et al. |
| 2003/0182145 A1 | 9/2003 | Kalthoff et al. |
| 2004/0064351 A1 | 4/2004 | Mikurak |
| 2004/0068526 A1 | 4/2004 | Singh |
| 2004/0088196 A1 | 5/2004 | Childress et al. |
| 2004/0111336 A1 | 6/2004 | Argust et al. |
| 2004/0139176 A1 | 7/2004 | Farrell et al. |
| 2004/0181425 A1 | 9/2004 | Schwerin-Wenzel et al. |
| 2004/0181771 A1 | 9/2004 | Anonsen et al. |
| 2004/0181775 A1 | 9/2004 | Anonsen et al. |
| 2004/0267689 A1 | 12/2004 | Gavlak et al. |
| 2005/0027732 A1 | 2/2005 | Kalima |
| 2005/0075941 A1 | 4/2005 | Jetter et al. |
| 2005/0096959 A1 | 5/2005 | Kumar et al. |
| 2005/0102192 A1 | 5/2005 | Gerrits et al. |
| 2005/0182768 A1 | 8/2005 | Waldorf et al. |
| 2006/0026319 A1 | 2/2006 | Rothman et al. |
| 2006/0178918 A1 | 8/2006 | Mikurak |
| 2006/0224613 A1 | 10/2006 | Bermender et al. |
| 2006/0235733 A1 | 10/2006 | Marks |
| 2006/0265272 A1 | 11/2006 | Bosa et al. |
| 2007/0016608 A1 | 1/2007 | Mullins |
| 2007/0121850 A1 | 5/2007 | Klos et al. |
| 2007/0192124 A1 | 8/2007 | Anderson et al. |
| 2007/0203803 A1 | 8/2007 | Stone et al. |
| 2007/0233287 A1 | 10/2007 | Sheshagiri et al. |
| 2007/0256050 A1 | 11/2007 | Behnia et al. |
| 2007/0260575 A1 | 11/2007 | Robinson et al. |
| 2007/0288412 A1 | 12/2007 | Linehan |
| 2008/0033700 A1 | 2/2008 | Kano et al. |
| 2008/0040245 A1 | 2/2008 | Wadawadigi et al. |
| 2008/0046868 A1 | 2/2008 | Tsantilis |
| 2008/0071561 A1 | 3/2008 | Holcombe |
| 2008/0098108 A1 | 4/2008 | Yu |
| 2008/0098378 A1 | 4/2008 | Kilbane et al. |
| 2008/0163164 A1 | 7/2008 | Chowdhary et al. |
| 2008/0235324 A1 | 9/2008 | Abernethy et al. |
| 2008/0256133 A1 | 10/2008 | Frankland et al. |
| 2008/0281833 A1 | 11/2008 | Cain et al. |
| 2009/0070783 A1 | 3/2009 | Schmidt et al. |
| 2009/0083632 A1 | 3/2009 | Brosh et al. |
| 2009/0089078 A1 | 4/2009 | Bursey |
| 2009/0089776 A1 | 4/2009 | Sonkin et al. |
| 2009/0150887 A1 | 6/2009 | Sanghvi et al. |
| 2009/0171819 A1 | 7/2009 | Von Der Emde et al. |
| 2009/0192884 A1 | 7/2009 | Lo |
| 2009/0210268 A1 | 8/2009 | Fan et al. |
| 2009/0216874 A1 | 8/2009 | Thain et al. |
| 2009/0222395 A1 | 9/2009 | Light et al. |
| 2009/0319685 A1 | 12/2009 | Martin |
| 2010/0070331 A1 | 3/2010 | Koegler et al. |
| 2010/0121740 A1 | 5/2010 | Reed et al. |
| 2010/0138017 A1 | 6/2010 | Vrba et al. |
| 2011/0055815 A1 | 3/2011 | Squillace |
| 2011/0167105 A1 | 7/2011 | Ramakrishnan et al. |
| 2011/0184969 A1 | 7/2011 | Idicula et al. |

OTHER PUBLICATIONS

Joan Lawson et al., "Orchestrating into End-to-End Processes", Oracle International Corporation, Mastering SOA, Part 3, Feb. 2007.

Bimal Mehta et al., "BizTalk Server 2000 Business Process Orchestration", Microsoft Corporation, 2001, Bulletin of the EEE Computer Society Technical Committee on Data Engineering, 2001.

BizTalk Orchestration: A Technology for Orchestrating Business Interactions White Paper, Microsoft Corporation, Jun. 5, 2000.

Lienhard et al, Workflow and Business Rules: a Common Approach, BPTrends, Sep. 2005, ivyTeam-SORECOGroup, Switzerland.

Xiaoyu Zhang and Denis Gračanin, "Service-Oriented-Architecture based Framework for Multi-User Virtual Environments", Proceedings of the 2008 Winter Simulation Conference, pp. 1-9.

Oracle®, "Oracle Fusion Middleware Developer's Guide for Oracle SOA Suite", 11g Release 1 (11.1.1) Part No. E10224-01, Chapter 31, pp. 1-25, http://download.oracle.com/docs/cd/E12839_01/integration.1111/e10224/bam_data_objects.htm.

Oracle®, "Oracle Fusion Middleware Fusion Developer's Guide for Oracle Application Development Framework", 11 g Release 1 (11.1.1) Part No. B31974-03, Chapter 41, pp. 1-6, http://download.oracle.com/docs/cd/E12839_01/web.1111/b31974/adv_ads.htm.

Sterling Commerce, "Sterling Distributed Order Mangement", pp. 1-2.

Oracle®, "Oracle it Service Management Suite Overview", pp. 1-3, http://www.oracle.com/technetwork/oem/grid-control/overview/twp-oracle-it-serv-mgmt-feature-ove-133400.pdf.

Oracle Data Sheet, "Oracle Order Management", Copyright 2009 Oracle; pp. 1-5.

Raju Addala, et al., U.S. Appl. No. 12/718,468, filed Mar. 5, 2010.
Raju Addala, et al., U.S. Appl. No. 12/718,647, filed Mar. 5, 2010.
Raju Addala, et al., U.S. Appl. No. 12/697,756, filed Feb. 1, 2010.
Raju Addala, et al., U.S. Appl. No. 12/718,501, filed Mar. 5, 2010.
Raju Addala, et al., U.S. Appl. No. 12/718,536, filed Mar. 5, 2010.
Raju Addala, et al., U.S. Appl. No. 12/718,625, filed Mar. 5, 2010.
Raju Addala, et al., U.S. Appl. No. 12/718,520, filed Mar. 5, 2010.
Raju Addala, et al., U.S. Appl. No. 12/718,475, filed Mar. 5, 2010.
Raju Addala, et al., U.S. Appl. No. 12/718,585, filed Mar. 5, 2010.
Raju Addala, et al., U.S. Appl. No. 12/718,383, filed Mar. 5, 2010.
Raju Addala, et al., U.S. Appl. No. 12/718,569, filed Mar. 5, 2010.

Gregor Hohpe and Bobby Woolf, "Enterprise Integration Patterns; Publish-Subscribe Channel", http://www.eaipatterns.com/PublishSubscribeChannel.html.

Gregor Hohpe and Bobby Woolf, "Enterprise Integration Patterns; Point-to-Point Channel", http://www.eaipatterns.com/Point-ToPointChannel.html.

Gregor Hohpe and Bobby Woolf, Enterprise Integration Patterns; Chapter 3, pp. 57-97, http://www.eaipatterns.com/docs/EnterpriseIntegrationPatterns_HohpeWoolf_ch03.pdf.

Gregor Hohpe, "Programming Without a Call Stack—Event-driven Architectures", pp. 1-10, http://www.eaipatterns.com/docs/EDA.pdf.

"Oracle Communications Order and Service Management™ Version 6.3", Administration Guide, First Edition, Sep. 2007.

Raju Addala, et al., U.S. Appl. No. 12/945,084, filed Nov. 12, 2010.
Fred Mahakian, et al., U.S. Appl. No. 12/900,816, filed Oct. 8, 2010.
Fred Mahakian, et al., U.S. Appl. No. 13/359,611, filed Jan. 27, 2012.

* cited by examiner

DISTRIBUTED ORDER ORCHESTRATION SYSTEM WITH EXTENSIBLE FLEX FIELD SUPPORT

FIELD

One embodiment is directed to a computer system generally, and more particularly to a computer system for managing an orchestration of business processes.

BACKGROUND

Order management systems are computer software and/or hardware systems implemented by a number of industries to facilitate order entry and processing. Companies, such as catalog companies and those utilizing electronic commerce, use order management systems to receive, process and fulfill customer orders. An order management system makes possible the entering of an order via a website shopping cart or data entry system. The system typically captures customer proprietary information and/or account level information for each order. Credit verification or payment processing may then be performed to check for available funds and validate the transaction. Valid orders are processed for warehouse fulfillment, including picking, packing and shipping of the ordered goods or services.

Order management systems can further include business rules that implement business logic catering to a customer's business. Each business can have its own unique requirements, and customers can define rules specific to their business. This provides customers with flexibility in processing the orders.

SUMMARY

One embodiment is directed to a distributed order orchestration system that creates a rule dictionary, where the rule dictionary includes one or more facts, and where each fact represents an object that is operated on by a rule. The distributed order orchestration system further creates one or more artifacts, where each artifact represents an extensible flex field object of the distributed order orchestration system. The distributed order orchestration system further publishes the one or more artifacts to a rule dictionary, where the rule dictionary includes one or more rules. The distributed order orchestration system further imports the one or more artifacts within the rule dictionary as one or more new facts. The distributed order orchestration system further creates a rule for the rule dictionary, where the rule references the one or more new facts.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is directed to a distributed order orchestration system that publishes one or more newly generated artifacts that are generated as a result of generating one or more extensible flex fields to a rule dictionary. The distributed order orchestration system then imports the one or more newly generated artifacts within the rule dictionary as one or more facts. The distributed order orchestration system then creates one or more rules for the rule dictionary that references the one or more facts.

Distributed Order Orchestration Framework

One embodiment is directed to a distributed order orchestration system ("DOO"). Distributed order orchestration provides a flexible, configurable infrastructure that can be easily customized to be consistent with an enterprise's business practices and existing order fulfillment system architecture. Decomposition is the conversion of data received from one or more order capture modules into an internal canonical format in order to process the data.

Figure 1:
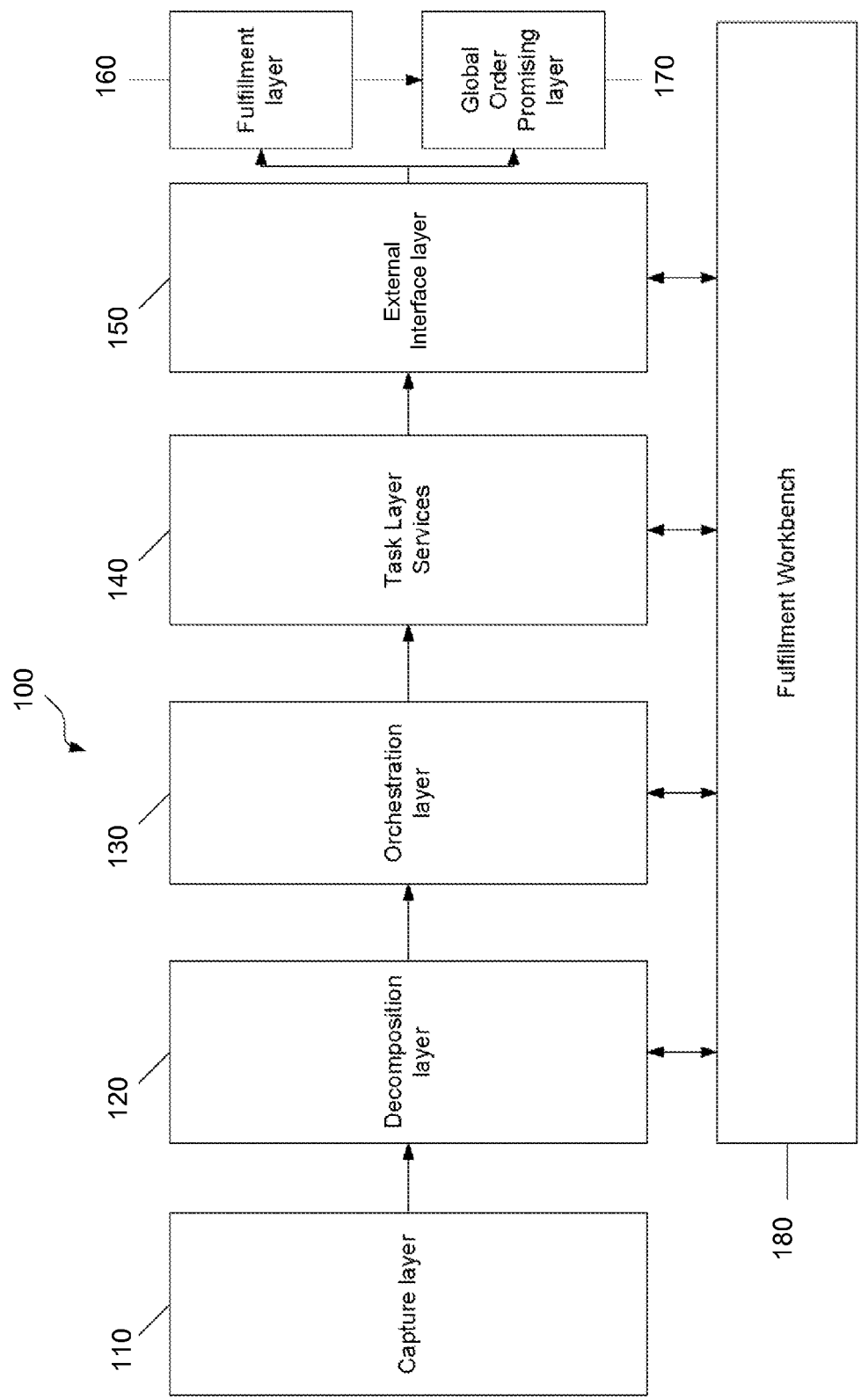
FIG. 1 illustrates an example of a distributed order orchestration system according to one embodiment.

FIG. 1 illustrates an example of a distributed order orchestration system 100 according to one embodiment. In the embodiment, distributed order orchestration system 100 includes a capture layer 110 that can receive and capture information related to customer orders for goods and/or services across multiple channels. The order may be received via a graphical user interface, such as that of a website shopping cart, or can be received via any data entry system. The capture layer 110 captures and forwards the order information to a decomposition layer 120. However, in an alternative embodiment, the capture layer 110 is separate from distributed order orchestration system 100. In this alternative embodiment, a connector service is utilized as a bridge between distributed order orchestration system 100 and capture layer 110.

Order capture systems capture the order with any necessary functional attributes that are needed to process the order, such as pricing, validation, eligibility, etc. The sales order is fed to decomposition layer 120 in a Source Order object. The source order object is generated from a sales order object submitted by different capture systems. The source order object is in a generic format that is fed into the decomposition layer 120.

Decomposition layer 120 receives the order information and breaks the received order into individual fulfillment requests to be sent to fulfillment systems and supply-side partners for execution. Decomposition layer 120 may include a decomposition rules workbench for setting up rules, rule sets, and transformation processes for the order capture layer 110 may capture the order from a sales perspective. For example, a laptop computer may be sold worldwide. The laptop includes a power cord, but the customer just buys a laptop (one line on the order). That is, a sales website may want to just sell the laptop and not have the customer individually order the power cord separately. However, from a fulfillment perspective, the laptop and the power cord need to be retrieved for the order. In decomposition layer 120, there may be a business rule that says that a laptop must have a power cord and the plug on the power cord must match the country to which the laptop is shipped. So when decomposition layer 120 is complete, the order has two lines, one with the laptop and one for the appropriate power cord. Thus, the order has been decomposed into multiple items that need to be fulfilled.

Also, decomposition layer 120 may take the received order and translate it to the order format and order content required by the other layers of the distributed order orchestration system 100, such as the fulfillment layer 160. Because capture layer 110 is capable of receiving orders in any format for compatibility purposes across different types of systems, decomposition layer 120 may need to translate the order into a format that is compatible with and can be recognized by all the other layers and/or processes of the distributed order orchestration system 100. Additionally, decomposition layer 120 may provide a process launch capability to assign and launch orchestration processes for an order based on appropriate decomposition rules. For example, different orchestration processes are assigned based on parameters in the order. A company may give special treatment to certain customers in terms of speed of fulfillment or shipping. For example, "Gold" customers may be offered expedited shipping. Also, there may be an additional step for communication with the customer. When the orders for these customers are received, they are assigned to the orchestration process that has these parameters and steps while orders for other customers may be assigned to standard processes.

Decomposition may use a canonical object model to accomplish the decoupling of data format from order capture systems. Decomposition integration processes work on a set of generic data structures called Enterprise Business Objects ("EBO's"). They are based on the canonical data model. This approach allows the DOO to be agnostic of participating applications and be independent of source or target applications. The model eliminates the need to map data from different applications directly to each other.

Distributed order orchestration system 100, as illustrated in FIG. 1, further includes an orchestration layer 130. Orchestration layer 130 provides individual orchestration processes to manage good and/or service line items. For example, orchestration layer 130 may provide business process management functionality to support planning of steps within a process, including step duration and calculation or recalculation of completion dates. Orchestration layer 130 may also provide external task execution functionality to support creation, update, release, and monitoring of external tasks. External tasks are those that are carried out by the fulfillment systems. Task layer services do specific processing and then send the data to these integrated fulfillment systems. Orchestration is a sequence of task layer service invocations.

Orchestration layer 130 may also provide for jeopardy management in order to check a promised delivery date of an order against current estimated date for completion, map to user defined thresholds, and handle or escalate conditions. Orchestration layer 130 may further provide a process for change orders, including a support process rollback to accommodate for change order automation and modify in-flight orchestration processes for orders changed in order capture stage. Further, a projected order completion date may be provided by instantiating the orchestration process. Orchestration layer 130 also provides a mechanism for updating an order status automatically or upon user request.

One embodiment provides a tool that provides a high degree of abstraction for business process modeling in an order fulfillment business process. Business processes may be modeled by users, such as business analysts, and do not need any coding from an IT designer to have the business process executed. Users are provided the flexibility to define business processes in a central place configured to enter and capture all information required for orchestration and fulfilling an order. An example of such a central place can be a web-based administration user interface. Likewise, an example of all information required for orchestration and order fulfillment may be information required for process planning, core orchestration, and change management. The business process may identify one or more services that define steps to be performed in the order fulfillment process. A run-time engine then uses the definition to dynamically invoke the services based on the definition of the business process.

In the business environment, business users are often process modelers, not IT personnel. By providing a web-based administration environment, the business users may be able to design the business process. The process definitions may be defined in business terms and not in IT terms. Particular embodiments allow an administrative environment outside of a code editor, such as a Business Process Execution Language ("BPEL") editor, for defining processes using associated services. Users can configure processes that can be executed at runtime as executable processes without IT involvement. This alleviates the need for deploying the processes every time a modification of the business process is needed. The user sets up the sequence of services on a data table. The modeled business process is then used to perform an executable process (also identified as an orchestration process), which is assembled and executed at run-time. In one embodiment, "runtime" can be defined as the time when an order is received for processing. Metadata is assembled in a data runtime table and used to define the executable process for the business process. The metadata is used to invoke services in the executable process.

In one embodiment, the services invoked are encapsulated and reusable. The metadata is used to determine how and when to invoke services. Also, depending on the metadata, input arguments are generated and sent to the services to invoke the encapsulated service. A common signature is used to send data to invoke the services. Different input arguments can be formulated for different services used in different executable processes. The input arguments are formatted in the same way such that a service can read the different sets of data and invoke the service. Thus, services can be re-used in different business processes without the need to be recoded and redeployed. Deployment of services indicates the process is ready to be released for testing or production.

Distributed order orchestration system 100 may further include a task layer services 140 to provide encapsulated services used to control processing logic for each orchestration process stage. In particular, task layer services 140 may provide task-specific business logic to wrap logic around a certain request such that the system 100 knows what logical tasks are associated with a particular request. The steps that need to be performed in the executable process from orchestration may require tasks to be performed. For example, task layer services 140 can provide and control processing logic for scheduling a shipment, requesting a shipment, updating an install base, creating an activity, etc. The output of task layer services 140 is a standard goods and/or service request(s) which may be provided to other layers of the system 100, such as external interface layer 150 or fulfillment layer 160. In addition, task layer services 140 may receive input that can be used to update the processing logic or status.

Task layer services 140 initiates the task, generates a message for an external system, and sends the message. The data structure that is needed to have the task performed is generated. Certain tasks may be predefined in task layer services. Also, a customer may add other tasks using a template that defines how to create a task. The message generated indicates which task should be performed by the external system. The task to be performed is an aspect of order processing that has been modeled. For example, the task may be invoicing for an order. Parameters for performing the task are also included. The message is sent to an external interface of external interface layer 150. Task layer services 140 transforms and sends the message to the external system layer.

Distributed order orchestration system 100 also includes an external interface layer 150 to translate standard request(s) and route the request(s) to external systems for processing. More specifically, external interface layer 150 may receive the standard goods and/or services request(s) output by the task layer services 140 and provide a single layer transform of the request(s) if needed to match the format of fulfillment systems. The transformation performed by external interface layer 150 maps the data to the content and format required by the integrated fulfillment systems. Transformation by decomposition layer 120 converts the data to the internal format used by system 100. External interface layer 150 may map the data structure from task layer services 140 to the external format. External interface layer 150 provides flexible routing so that request(s) are routed to specific fulfillment systems based on business rules. For example, if more than one shipping system is available for fulfillment, business rules will determine to which shipping system an individual shipping request will be sent. External interface layer 150 may also include a transformation rules workbench that can be utilized to setup rules, rule sets, and transformation data for external routing of request(s).

The messages generated by the task layer may be in a generic format. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

The external systems may be systems that perform the task related to processing an order, such as a scheduling system, shipping system, etc. When the task is performed, the result of the task is determined. The result may be a date when a shipment is scheduled, a date when a good is shipped, etc. The result is then sent back to external interface layer 150.

Distributed order orchestration system 100 may further include a global order promising layer 170 that provides an interface, such as a graphical user interface, for scheduling and sourcing orders. In particular, in one embodiment, global order promising layer 170 includes a sourcing broker that determines the best source for products and services associated with the order based upon a customer profile, order and supplier definitions, etc. Also, global order promising layer 170 provides for real-time reserve and un-reserve of inventory and inventory check across distributed internal systems. The interface of global order promising layer 170 allows for the viewing of availability and sourcing information so that a user can view the availability of and manually change the source from which an order for a good or service is being fulfilled. However, in an alternative embodiment, global order promising layer 170 is separate from distributed order orchestration system 100. In this alternative embodiment, a connector service is utilized as a bridge between distributed order orchestration system 100 and global order promising layer 170.

A fulfillment workbench 180 may also be provided as a user interface for order fulfillment administrators, users and supervisors to monitor and manage the flow of orders through the system 100. In an embodiment, fulfillment workbench 180 provides users, such as supervisors, with a mechanism to monitor order fulfillment tasks, including allowing supervisors to monitor activity load and to produce reports. Fulfillment workbench 180 further provides a fulfillment process analysis that allows business process designers to analyze process metrics such as the number of manual interventions, the number and type of errors that occurred, the number of late orders, and the expected process duration versus the actual duration. In certain embodiments, a fulfillment system performance analysis capability is also included within fulfillment workbench 180 to provide reports and dashboards to enable order managers to view orders for each system and analyze performance. The fulfillment workbench may make use of graphical representations (e.g., graphs and charts) to clearly convey system status/order information to users. Because DOO system 100 has the data reference data, it is possible to draw aggregated graphs/charts for trending analysis. Users may take actions from the fulfillment workbench as described below, such as by substituting the item ordered, splitting the quantity into multiple order lines, putting a hold on the order lines to prevent further progression, etc.

According to one embodiment, fulfillment workbench 180 allows users to make mass order information changes related to fulfillment including making single line or mass line changes to fulfillment information (e.g., dates, etc.). Fulfillment workbench 180 may further allow for the monitoring of orchestration processes, such as reviewing the status of orchestration processes including overall process progress, as well as status of individual tasks and corresponding fulfillment lines and people lines. Fulfillment workbench 180, in one embodiment, includes mechanisms for maintaining order fulfillment processing and allows an order processing user to control a process associated with an order including pause, edit, cancel, etc.

In some embodiments, fulfillment workbench 180 also provides functionality for order and task assignment. For example, fulfillment workbench 180 may use an assignment engine to assign orders and activities to the appropriate fulfillment resource. Fulfillment workbench 180 may include a mechanism for batch re-assignment of orders thereby allowing a supervisor to re-source a set of orders from one fulfillment system to another. Fulfillment workbench 180 also provides for the assignment of fill rate and backorder rules that can automatically determine how to handle shortage situations. A universal in-box may be included within fulfillment workbench 180 in order to allow users to view activities assigned to them and respond to the task.

Fulfillment workbench 180 allows a user to view orders being processed in different layers of system 100. A view of the status of an order may be generated from whichever layers have processed the order. This is because an end to end integrated system has been provided. Conventional order systems may have been customized solutions that did not allow for a view of different layers. By integrating layers in a format that allows generic communication, a user interface that can generate views from all the layers can be provided.

Examples of distributed order orchestration system 100 may also include a fulfillment layer 160. In one embodiment, fulfillment layer 160 may be an interface to external fulfillment systems, and can be used to communicate order information and fulfillment requirements to a supplier or source of the goods and/or services associated with an order.

Certain embodiments of distributed order orchestration system 100 include an administration user interface. The administration user interface provides administration services that hide the complexity of the fulfillment execution environment from the end user. For instance, the administration user interface provide product mapping via an administration environment that defines transformations to map product structure between a sales view and a supplier system definition. In this embodiment, sales view refers to a simplified view provided to consumers when placing a sales order. Supplier system definition refers to the more specific and detailed information used by suppliers of goods and/or services. The administration user interface may also provide an orchestration process workbench to set up processes, rule sets, and parameters for order orchestration. The administration user interface has an integrated setup that includes process sequence, planning, jeopardy, change management, and workbench display. The administration user interface also allows for user-defined status transitions for tasks, processes, and fulfillment lines, and business rules configuration for configuring constraints, transformation rules, and routing rules.

Further details of a distributed order orchestration system are described in U.S. patent application Ser. No. 12/617,698, entitled "DISTRIBUTED ORDER ORCHESTRATION," U.S. patent application Ser. No. 12/718,585, entitled "CHANGE MANAGEMENT FRAMEWORK IN DISTRIBUTED ORDER ORCHESTRATION SYSTEM," and U.S. patent application Ser. No. 12/697,756, entitled "ORCHESTRATION OF BUSINESS PROCESSES USING TEMPLATES," the disclosures of which are hereby incorporated by reference.

Extensible Flex Field Support for Rule Dictionaries

One embodiment is directed to a distributed order orchestration system that publishes one or more newly generated artifacts that are generated as a result of generating one or more extensible flex fields to a rule dictionary. The distributed order orchestration system then imports the one or more newly generated artifacts within the rule dictionary as one or more facts. The distributed order orchestration system then creates one or more rules for the rule dictionary that references the one or more facts.

Order management systems have been in the past confined to a pre-defined set of data models. This poses a challenge to meet various business requirements of different customers. In the past, order processing has used a descriptive and key flex field framework, which allowed for limited extensibility. More recently, some order management systems have includes an extensible flex field framework that allows a data model to be extensible for a single entity in multiple different ways. However, the currently available frameworks have a low degree of flexibility in terms of processing dynamically generated content without code changes to the order management system.

As an application developer, it is often impossible to anticipate all database columns and user interface ("UI") fields a customer may need, or how each field should look as end users' needs change. Flex fields enable customers to configure their applications to meet their business needs without having to perform custom development. The basic premise of a flex field is to encapsulate all of the pieces of information related to a specific purpose, such as components of a customer's contact information, or features of a product in inventory, or a key identifying a particular purchase by a particular person for a particular company on a particular date. A flex field is an "expandable" data field that is divided into segments. A segment captures a single atomic value, which is represented in the application database as a single column. In the application UI, a flex field's segments can be presented as individual table columns, as separate fields, or as a concatenated string of values. Customers can configure a flex field by specifying the prompt, length, and data type of each flex field segment.

A flex field structure is a specific configuration of segments. If a user adds or remove segments to/from a flex field, or rearranges the order of segments in a flex field, the user produces a different structure. In some applications, different users need to see individually tailored segment structures for the same flex field (for example, the correctly formatted local postal address for customer service inquiries, which would change based on the user's locale). Flex fields allow for multiple structures. All the segments that a flex field might need to create all the desired structures are defined as part of the flex field. Furthermore, flex fields are context-sensitive; this means that they are varied or made available in the application by implementers and administrators to reflect needs of an organization for which the application is being configured. Thus, segments are made available to an application as groups of attributes called "contexts." Each context is defined as part of a flex field, and is comprised of a set of context-sensitive segments that store a particular type of related information.

Flex fields include descriptive flex fields and extensible flex fields. A descriptive flex field provides a set amount of segments for an entity in an application, which a customer can optionally use to add custom attributes to the entity, define how the attributes are validated, and configure how the attributes are displayed. Extensible flex fields are similar to descriptive flex fields, but include the following additional features. First, there can be multiple contexts for a given extensible flex field, where segments can be organized into different contexts, and the number of segments can be extended. Second, attributes can be grouped so they will always be presented together in an application UI. Third, hierarchical categories enable entities to inherit the segments that are configured for their parents. Fourth, extensible flex fields support one-to-many relationships between an entity and the extended attribute rows.

More specifically, an extensible flex field is a logical grouping of segments (i.e., attributes) that are mapped to a set of extension columns of one or more database tables, where the database tables are extension database tables, separate from a base application database table. The database columns that are to be used for the extensible flex field segments are created at design time of an application, but the mapping of segments to database columns, how the segments are organized and associated, and which segments appear together on an application page, are determined by implementers working on behalf of an application owner. Thus, much of the usefulness of an extensible flex field derives from the decisions that are made during application installation and configuration. In addition to extension database tables, entity objects, view objects, and an application module are defined and configured for each set of extension database tables that are defined for each extensible flex field usage. Such entity objects, view objects, and application modules are examples of application objects, and are collectively referred to as "artifacts."

Furthermore, applications sometimes require dynamic decisions at runtime which allow for the automation of policies, computations, and reasoning while separating rule logic from underlying application source code. Applications can include "business rules," or "rules," which are statements that describe business policies or describe key business decisions. A business rule can follow an if-then structure, where the if part represents a condition or pattern match, and the then part represents a list of actions. The if part of a rule is composed of conditional expressions, or rule conditions, that refer to "facts." A "fact" is an object that a rule reasons on, and a fact is an asserted instance of an object class. Examples of facts are extensible markup language ("XML") schema objects, Java classes, rule language ("RL") definitions, and application development framework ("ADF") business component view objects. The then part of the rule contains the actions that are executed when the rule is executed. Business rules can be contained within a rule set, which is a container for business rules. Rule sets can be contained within a rule dictionary, which is a container (for example an XML file) for rule sets and an application data model. A rule dictionary may contain any number of rule sets.

In previous applications, business rules could not access artifacts (such as view objects and entity objects) that were newly created within an application during installation and configuration of an application. Instead, business rules could only access artifacts that were created at design time of the application. This is because business rules that are created at design time do not have visibility to the new artifacts that are created based on the extensible flex fields, and do not have visibility to how customers will extend an existing data module. Instead, the business rules only have visibility to the data model that is created at design time. According to embodiments of the invention, business rules are given visibility to new artifacts that are created at run time, and thus, business rules can access artifacts that are created at run time of the application, as is described below in greater detail.

Figure 2:
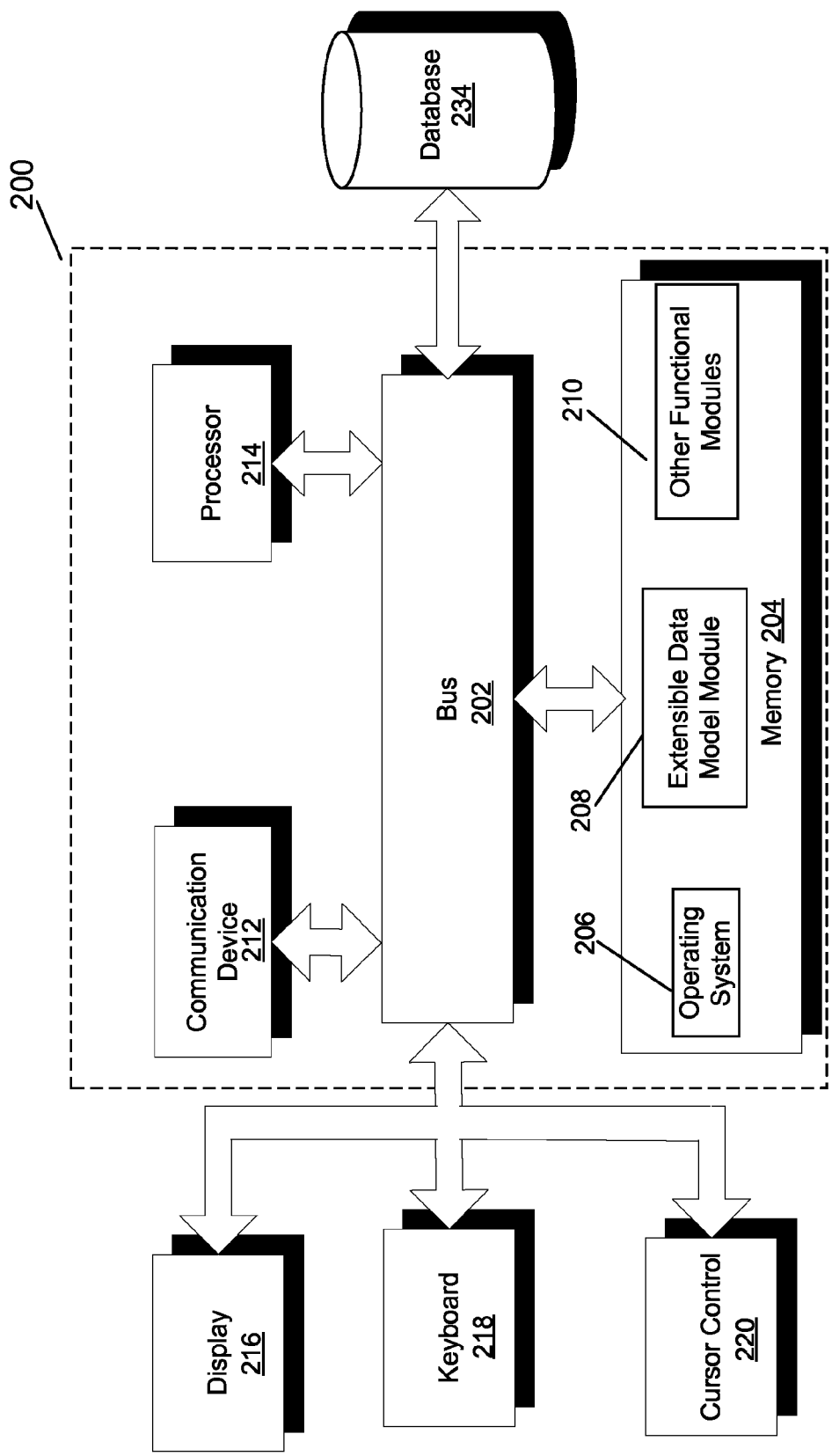
FIG. 2 illustrates a block diagram of a system that may implement an embodiment of the present invention.

FIG. 2 illustrates a block diagram of a system 200 that may implement one embodiment of the invention. System 200 includes a bus 202 or other communications mechanism for communicating information between components of system 200. System 200 also includes a processor 214, operatively coupled to bus 202, for processing information and executing instructions or operations. Processor 214 may be any type of general or specific purpose processor. System 200 further includes a memory 204 for storing information and instructions to be executed by processor 214. Memory 204 can be comprised of any combination of random access memory ("RAM"), read only memory ("ROM"), static storage such as a magnetic or optical disk, or any other type of machine or computer-readable medium. System 200 further includes a communication device 212, such as a network interface card or other communications interface, to provide access to a network. As a result, a user may interface with system 200 directly or remotely through a network or any other method.

A computer-readable medium may be any available medium that can be accessed by processor 214. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 214 can also be operatively coupled via bus 202 to a display 216, such as a Liquid Crystal Display ("LCD"). Display 216 can display information to the user. A keyboard 218 and a cursor control device 220, such as a computer mouse, can also be operatively coupled to bus 202 to enable the user to interface with system 200.

According to one embodiment, memory 204 can store software modules that may provide functionality when executed by processor 214. The modules can include an operating system 206, an extensible data model module 208, as well as other functional modules 210. Operating system 206 can provide an operating system functionality for system 200. Extensible data model module 208 can provide functionality for leveraging extensible flex fields within rule dictionaries and within a distributed order orchestration system, as well as leveraging custom rule dictionaries, as will be described in more detail below. In certain embodiments, extensible data model module 208 can comprise a plurality of modules that each provide specific individual functionality for leveraging extensible flex fields within rule dictionaries, and within a distributed order orchestration system, as well as leveraging custom rule dictionaries. System 200 can also be part of a larger system. Thus, system 200 can include one or more additional functional modules 210 to include the additional functionality. For example, functional modules 210 may include modules that are part of the "Fusion" product from Oracle Corporation. An example of a module that is part of the "Fusion" product is a distributed order orchestration module as described in U.S. patent application Ser. No. 12/617,698, entitled "DISTRIBUTED ORDER ORCHESTRATION," U.S. patent application Ser. No. 12/718,585, entitled "CHANGE MANAGEMENT FRAMEWORK IN DISTRIBUTED ORDER ORCHESTRATION SYSTEM," and U.S. patent application Ser. No. 12/697,756, entitled "ORCHESTRATION OF BUSINESS PROCESSES USING TEMPLATES."

Processor 214 can also be operatively coupled via bus 202 to a database 234. Database 234 can store data in an integrated collection of logically-related records or files. Database 234 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 3:
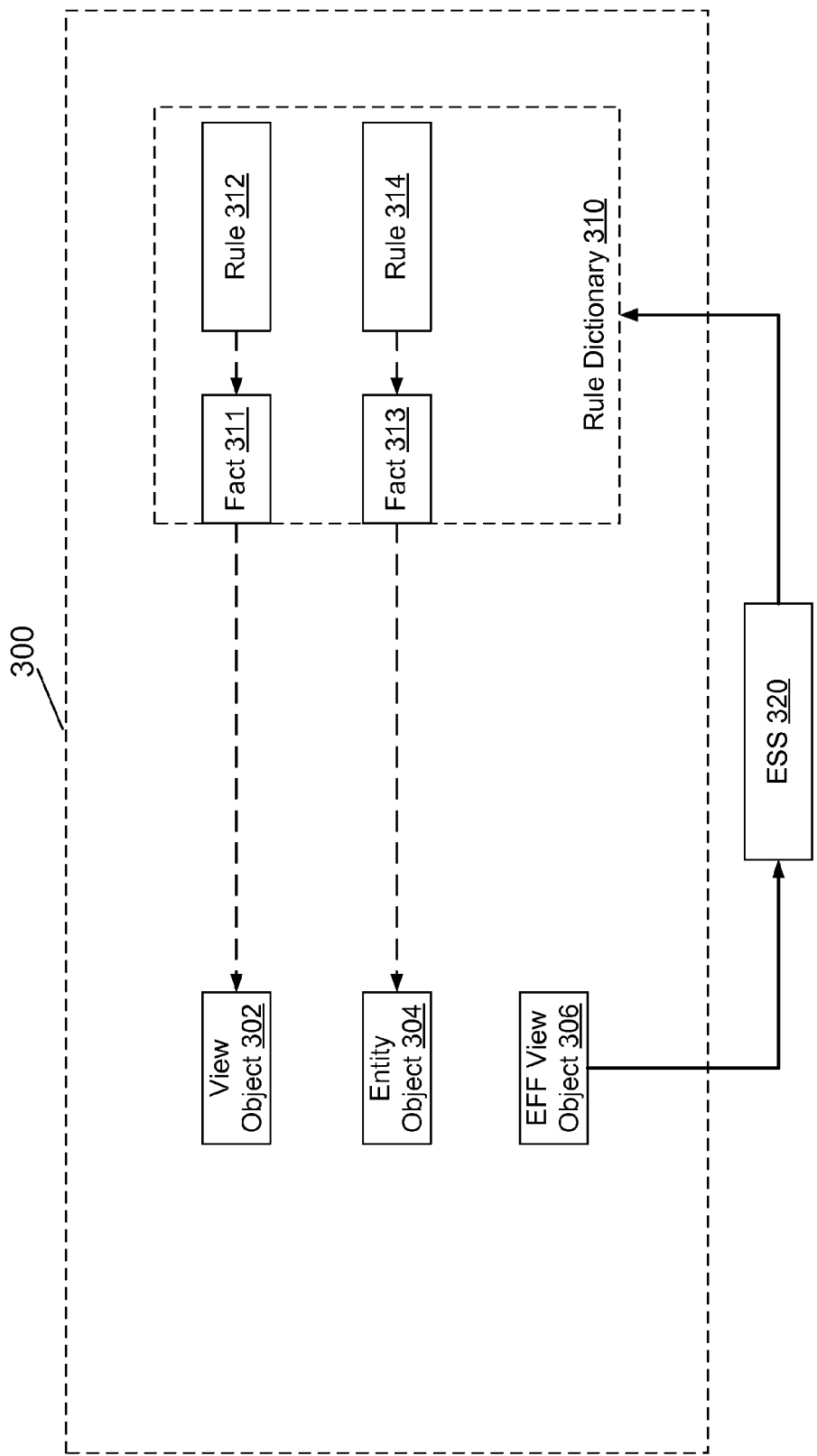
FIG. 3 illustrates a block diagram of an application where a newly generated artifact is published to a rule dictionary, according to an embodiment of the invention.

FIG. 3 illustrates a block diagram of an application 300 where a newly generated artifact is published to a rule dictionary, according to an embodiment of the invention. According to the embodiment, application 300 includes a data model that includes one or more artifacts that are created at design time, such as view objects and entity objects. In the illustrated embodiment, application 300 includes view object 302 and entity object 304. However, this is merely an example embodiment, and in alternate embodiments, application 300 can include any number of artifacts, such as view objects and/or entity objects. Application 300 also includes a rule dictionary 310. Rule dictionary includes facts 311 and 313 that are created at design time, where fact 311 represents view object 302, and fact 313 represents entity object 304. Furthermore, rule dictionary includes rules 312 and 314 that are also created at design time, where rule 312 references fact 311, and rule 314 references fact 313.

As previously described, an extensible flex field framework provides a customer of application 300 to extend the existing data model, where the extensible flex field framework allows a customer to generate new artifacts during installation or configuration of application 300 (i.e., at run time). In the illustrated embodiment, the extensible flex field framework generates a new artifact, extensible flex field ("EFF") view object 306 at run time. However, rule dictionary 310, which is created at design time, does not have visibility to extensible flex field view object 306, since extensible flex field view object 306 is generated at run time. Thus, rule dictionary 310 does not include any rules that reference extensible flex field view object 306.

According to the embodiment, an enterprise schedule service ("ESS") program 320 can be invoked once a newly generated artifact, such as extensible flex field view object 306, is created. By invoking enterprise schedule service program 320, a computer program (not shown) is invoked that publishes extensible flex field view object 306 to rule dictionary 310. By publishing extensible flex field view object 306 to rule dictionary 310, extensible flex field view object 306 becomes visible to rule dictionary 310, and one or more rules can be created that reference extensible flex field view object 306, as is described below in greater detail in relation to FIG. 4. In one embodiment, enterprise schedule service program 320 can be invoked manually, such as after a new artifact is created. In an alternate embodiment, enterprise schedule service program 320 can be scheduled so that enterprise schedule service program 320 is invoked automatically. In this embodiment, the computer program invoked by enterprise schedule service program 320 first checks if there are any newly created artifacts.

Figure 4:
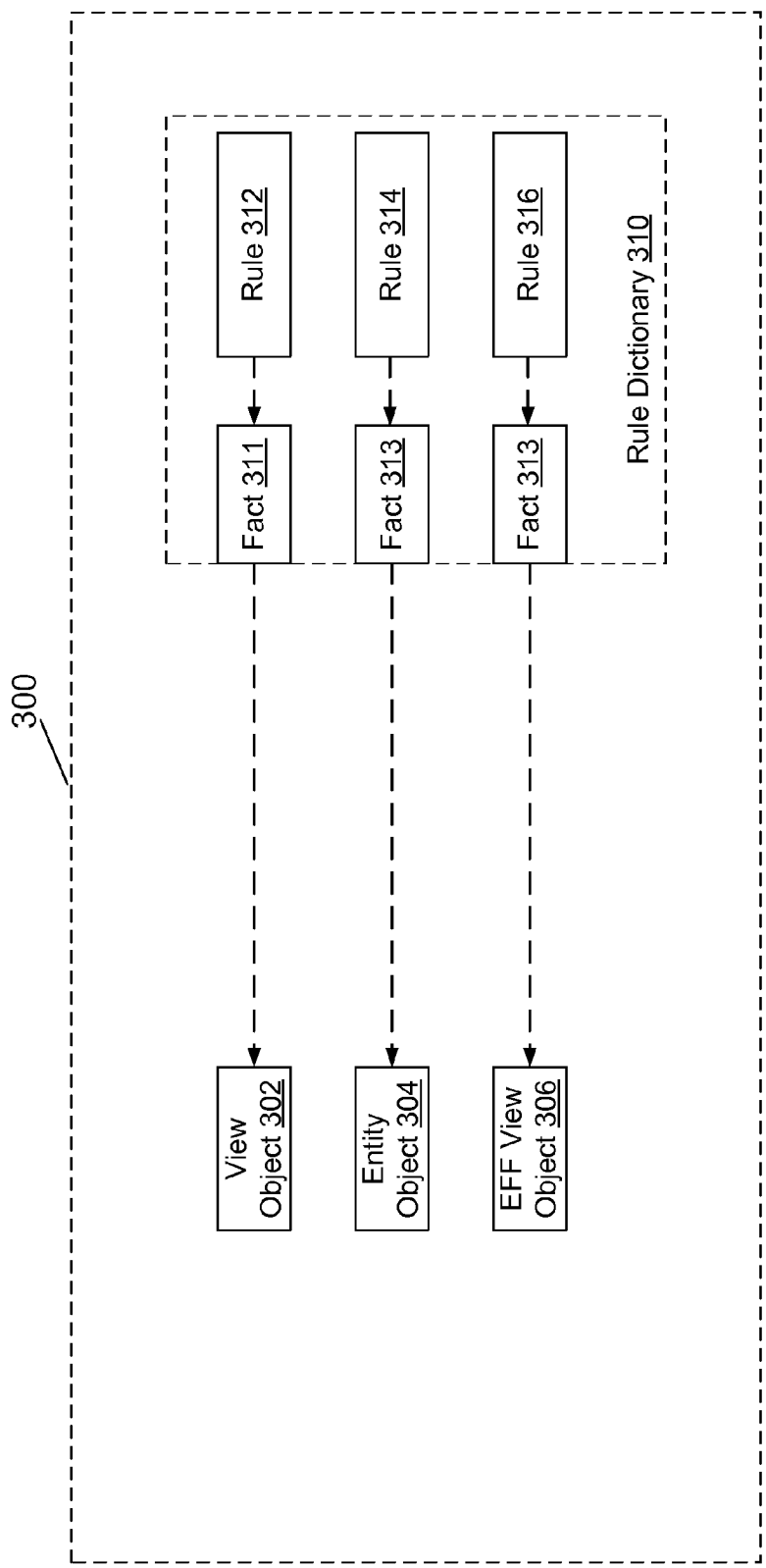
FIG. 4 illustrates a block diagram of an application where a business rule is created that references the newly generated artifact, where the artifact has been imported into the rule dictionary, according to an embodiment of the invention.

FIG. 4 illustrates a block diagram of an application 300 where a business rule is created that references the newly generated artifact, where the artifact has been imported into the rule dictionary, according to an embodiment of the invention. Elements of FIG. 4 that are also illustrated in FIG. 3 are not described again. According to the embodiment, extensible flex field view object 306 is visible to rule dictionary 310, and has been imported into rule dictionary 310 as fact 313. Because extensible flex field view object 306 has been imported into rule dictionary 310 as fact 313, new business rules can be created that reference fact 313. In the illustrated embodiment, rule 316 is generated, where rule 316 references fact 313. Therefore, according to the embodiment, rule 316 references flex field view object 306.

Figure 5:
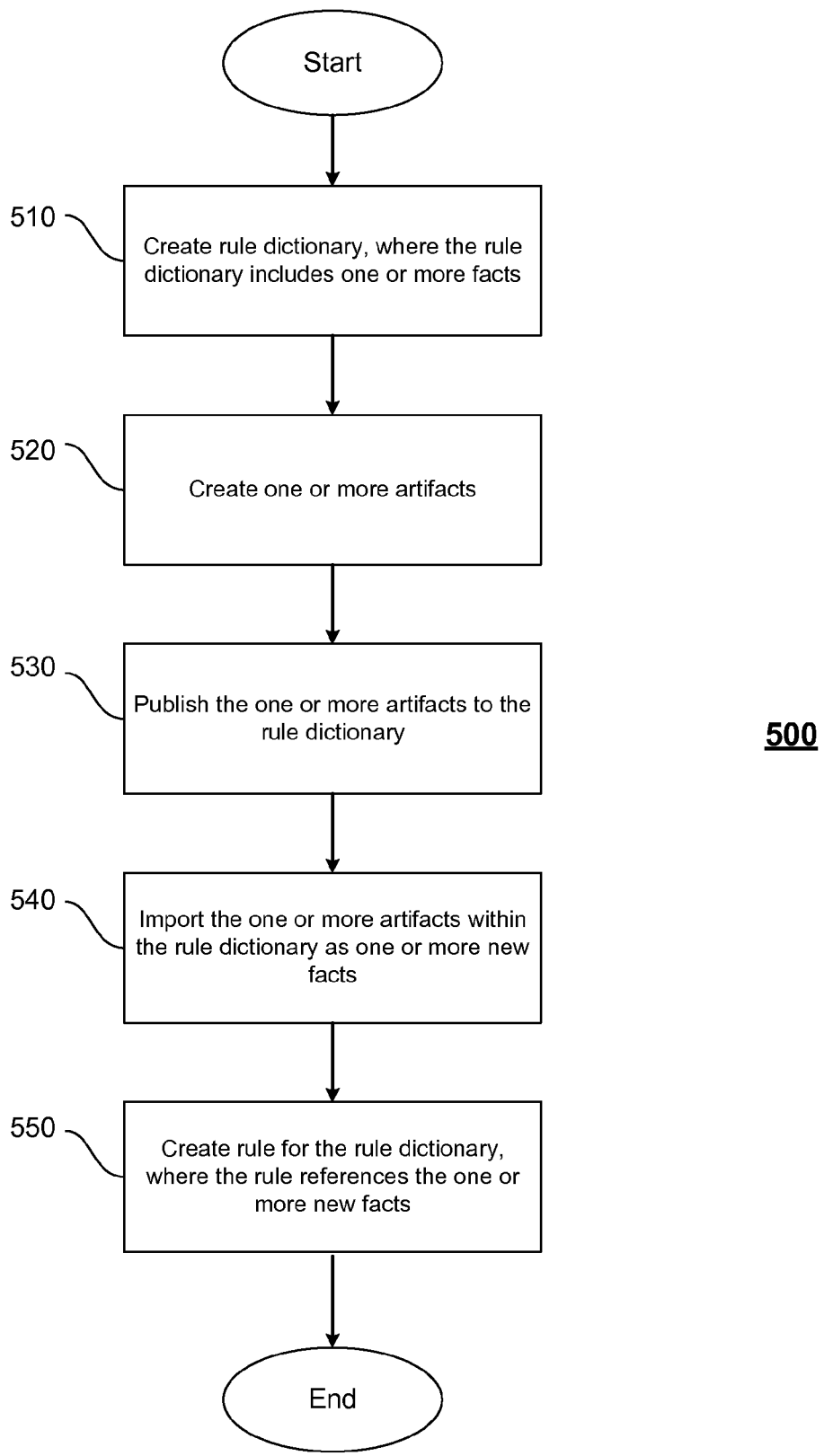
FIG. 5 illustrates a flow diagram of the functionality of an extensible data model module according to an embodiment of the invention.
Figure 11:
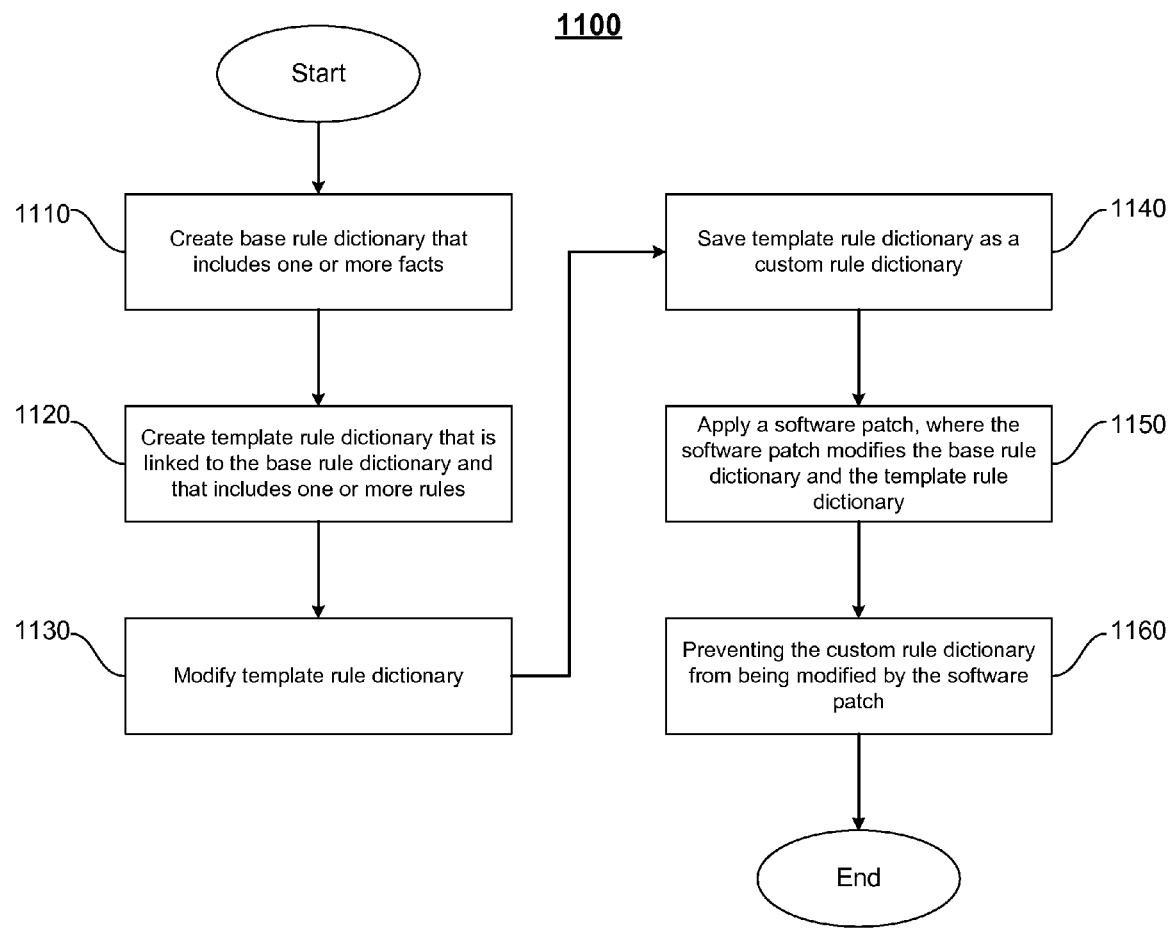
FIG. 11 illustrates a flow diagram of the functionality of an extensible data module according to another embodiment of the invention.

FIG. 5 illustrates a flow diagram 500 of the functionality of an extensible data model module according to an embodiment of the invention. In one embodiment, the functionality of flow diagram 500 of FIG. 5, as well as the functionality of flow diagram 700 of FIG. 7, the functionality of flow diagram 800 of FIG. 8, and the functionality of flow diagram 1100 of FIG. 11, is implemented by software stored in memory or other computer-readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 510, a rule dictionary is created, where the rule dictionary includes one or more facts, and each fact of the one or more facts represents an object that is operated on by a rule. At 520, one or more artifacts are created, where each artifact represents an extensible flex field object of a distributed order orchestration system. At 530, the one or more artifacts are published to a rule dictionary, where the rule dictionary includes one or more rules. At 540, the one or more artifacts are imported within the rule dictionary as one or more new facts. At 550, a rule is created for the rule dictionary, where the rule references the one or more new facts.

Thus, according to an embodiment, a data model that is utilized by rule dictionaries can be extended. One or more extendible flex fields can be defined and deployed, generating one or more new artifacts. These newly generated artifacts can be published to one or more rule dictionaries using an enterprise schedule service program. One or more business rules can thus be created using the extendible flex fields. Thus, business rules can be more flexible, as they can access user-defined extendible flex fields. Therefore, customers of an application can further leverage the extended data model that they create at run time of the application.

Extensible Flex Field Support for Distributed Order Orchestration System

One embodiment is directed to a distributed order orchestration system that leverages one or more newly generated service data objects that are generated as a result of generating one or more extensible flex fields. The distributed order orchestration system automatically processes the one or more newly generated service data objects through the distributed order orchestration framework. The automatic processing of the one or more newly generated service data objects includes synchronizing the one or more newly generated service data objects with one or more service-oriented architecture service data objects.

As previously described, an extensible flex field is a logical grouping of attributes that are mapped to a set of extension columns of one or more database tables, where the database tables are extension database tables, separate from a base application database table. As also previously described, in addition to extension database tables, artifacts, such as entity objects, view objects, and application modules, are defined and configured for each set of extension database tables that are defined for each extensible flex field usage.

In certain embodiments, such artifacts (such as view objects and entity objects) are part of an application development framework ("ADF"), that is based on a model-view-controller ("MVC") design pattern. An MVC design pattern divides an application into three layers: a model layer that handles interactions with data sources and runs business logic; a view layer that handles the application user interface; and a controller layer that manages the application flow, and acts as an interface between the model layer and the view layer. An example of an ADF is an Oracle ADF by Oracle Corporation.

In embodiments based on an Oracle ADF, artifacts can be Oracle ADF business components, such as Oracle ADF view objects and Oracle ADF entity objects. Oracle ADF view objects are business components that can collect data from a data source, shape data collected from a data source for use by one or more users of an application, and allow users to change the collected data. Oracle ADF view objects can be defined, at least in part, by extensible markup language ("XML") files that specify metadata, such as a query that retrieves the view object's data, the view object's attributes, and entity object usages. Oracle ADF view objects can also optionally be defined by up to two Java classes: a view object class, and a view row class. An instance of a view object class is a view object instance, which is a specific reference to an Oracle ADF view object definition within an application module definition. An instance of a view row class represents a single row returned by the view object's mechanism.

Oracle ADF entity objects are business components that encapsulate a business model, including data, rules, and persistence behavior for objects within an application. Oracle ADF entity objects can be defined, at least in part, by XML files that specify metadata about the data source, such as table name and attribute definitions, and business logic, such as business logic that represents most column constraints, validation, and security logic. Oracle ADF entity objects can also optionally be defined by up to three Java classes: an entity object class, an entity collection class, and an entity definition class. An instance of an entity object class represents a single row from a data source associated with the entity object. An instance of an entity collection class represents a collection of rows associated with the entity object currently in a memory for a user. An instance of an entity definition class (that is a singleton instance) represents the entire entity object.

Thus, in certain embodiments, a distributed order orchestration system includes an Oracle ADF business components ("BC") layer. The ADF BC layer includes one or more artifacts (such as view objects and entity objects) that represent objects that are processed by the distributed order orchestration system, and can include one or more newly generated artifacts (such as view objects and entity objects) that are generated as a result of generating one or more extensible flex fields. Furthermore, when a method of the ADF BC layer is exposed within the distributed order orchestration system as a service, one or more associated view objects can become service data objects, where the service takes the service data object as input. Thus, a service data object can be coupled with an associated view object. Therefore, the ADF BC layer can include one or more newly generated service data objects.

According to certain embodiments, the distributed order orchestration system utilizes a service-oriented architecture ("SOA") framework for orchestration. A SOA framework is a set of principles and methodologies for designing and developing software applications in the form of one or more interoperable services. The one or more interoperable services are business functionalities that are built as software components. Thus, in addition to an ADF BC layer, a distributed order orchestration system can also include a SOA layer that invokes the one or more ADF BC services.

According to the embodiments, to properly invoke the one or more ADF BC services, it is necessary for the SOA layer to understand the structure of the entities associated with the ADF BC services. In other words, to invoke an ADF BC service, it is necessary for an SOA entity to understand the associated service data object. Thus, any newly generated artifacts (such as service data objects) within the ADF BC layer need to be synchronized with a corresponding artifact in the SOA layer, so that the SOA layer has visibility to the newly generated artifacts, and so that the newly generated artifacts are available for use in the services of the distributed order orchestration system. Any newly generated artifacts will not be visible within the distributed order orchestration system (and users of a distributed order orchestration cannot utilize extensible flex fields associated with the newly generated artifacts) until this synchronization occurs. Thus, any newly generated artifacts within the ADF BC layer are not visible in services within the SOA layer until they are synchronized. Thus, while newly generated artifacts can reside within a repository within the ADF BC layer, they also need to be synchronized with artifacts that reside within a metadata repository within the SOA layer.

More specifically, according to certain embodiments, when a data model is extended by generating one or more extensible flex fields, one or more artifacts (such as view objects) are generated within an ADF BC layer, which are exposed by one or more ADF BC services as service data objects. These one or more service data objects can be stored within a metadata repository within the ADF BC layer. In order for these service data objects to be leveraged by the distributed order orchestration system, one or more corresponding service data objects are generated within a repository of a SOA layer. This can be done by invoking a computer program that creates a copy of the one or more service data objects within a metadata repository of the ADF BC layer, and stores the one or more service data object copies within a metadata repository of the SOA layer. Thus, the computer program synchronizes the service data objects within the ADF BC repository with one or more service data objects within a SOA repository. By synchronizing the newly generated service data objects, the newly generated service data objects are visible to the SOA layer, and the SOA layer understands the newly generated service data objects.

Furthermore, in certain embodiments, the distributed order orchestration system receives data from an order capture system, and sends data to a fulfillment system using outwardly facing interfaces, where the outwardly facing interfaces use one or more service data objects. These interfaces are part of the overall SOA framework, whether data is transformed from one format into another format, so that the data is in a format that is appropriate for the system. For example, the distributed order orchestration system can receive data from an order capture system in the format of an enterprise business message ("EBM"). An EBM is a message that is exchanged between two systems, and can be in an XML format. An EBM can contain data attributes that are mapped to data attributes of a service data object of a distributed order orchestration system. According to the embodiment, the distributed order orchestration system can transform the received EBM into a service data object that can be processed by the distributed order orchestration system. More specifically, the distributed order orchestration system can transform the XML of the EBM into XML of a service data object. Similarly, the distributed order orchestration system can send data to a fulfillment system in the format of an EBM. However, before the distributed order orchestration sends the data in the format of the EBM, the distributed orchestration system can transform a corresponding service data object into an EBM. More specifically, the distributed order orchestration system can transform the XML of the service data object into XML of an EBM.

According to the embodiments, to handle extensible flex fields, the distributed order orchestration system can allow a user to provide a mapping of one or more attributes of an EBM that is received from an order capture system, that are associated with extensible flex fields, to one or more elements of a service data object, that are also associated with extensible flex fields. The distributed order orchestration system can then deploy these mappings as a customized composite. A customized composite is an object that can have composite transformation mapping activity that converts an EBM to a service data object, or a service data object to an EBM, as customized. The customized composite can then be deployed as part of the distributed order orchestration system, and can then be utilized by the distributed order orchestration system to transform an EBM that contains extensible flex fields to a service data object. The service data object (and the data contained within the service data object) can be sent from the SOA layer to the ADF BC layer, where the service data object can be processed and persisted within a data source, such as a database. Thus, a user can create mappings for extensible attributes in a customized scope using a customized composite, and then deploy the customized composite to leverage newly generated extensible flex artifacts.

Similarly, the distributed order orchestration system can allow a user to provide a mapping of one or more attributes of the service data object, that are associated with extensible flex fields, to one or more attributes of an EBM that is sent to a fulfillment system, that are also associated with extensible flex fields. The distributed order orchestration system can then deploy these mappings as a customized composite. As previously described, a customized composite is an object that can have composite transformation mapping activity that converts an EBM to a service data object, or a service data object to an EBM, as customized. The customized composite can then be deployed as part of the distributed order orchestration system, and can then be utilized to transform a service data object that contains extensible flex fields to an EBM. Therefore, as also previously described, a user can create mappings for extensible attributes in a customized scope, using a customized composite, and then deploy the customized composite to leverage newly generated extensible flex artifacts. Thus, in certain embodiments, an end-to-end flow for leveraging artifacts associated with extensible flex fields is provided. Such an end-to-end flow is described below in greater detail.

Figure 6:
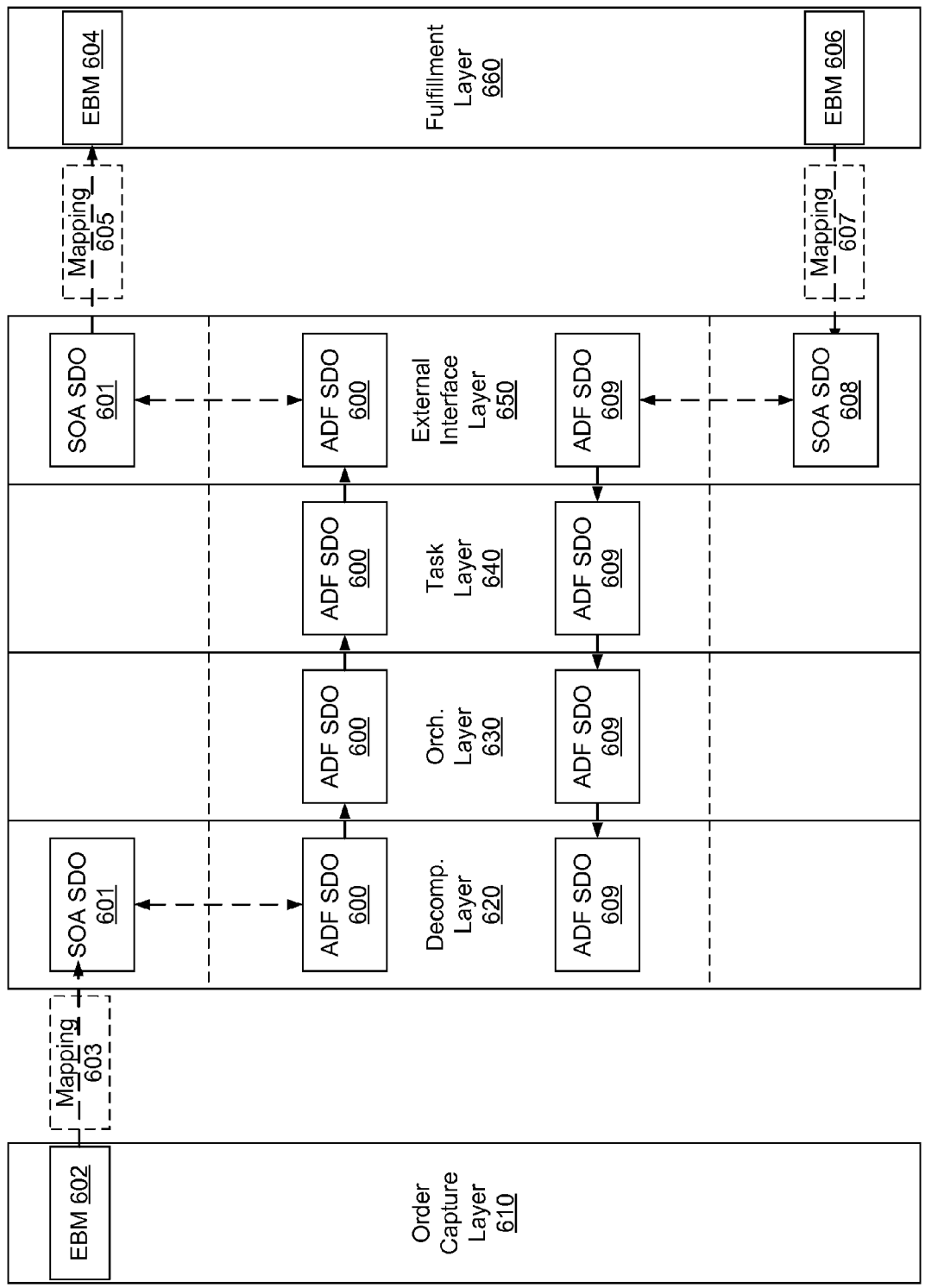
FIG. 6 illustrates a block diagram of a distributed order orchestration system that leverages newly generated service data objects, according to an embodiment of the invention.

FIG. 6 illustrates a block diagram of a distributed order orchestration system that leverages newly generated service data objects, according to an embodiment of the invention. According to the embodiment, the distributed order orchestration system includes an order capture layer 610, a decomposition layer 620, an orchestration layer 630, a task layer 640, an external interface layer 650, and a fulfillment layer 660. The respective layers of the distributed order orchestration system are similar to the corresponding layers previously described in relation to FIG. 1, and the functionality of each layer is not repeated here. As previously described, the distributed order orchestration system can execute an end-to-end flow for leveraging service data objects associated with extensible flex fields. According to the illustrated embodiment, a service data object is first generated within an ADF BC layer of decomposition layer 620 (i.e., ADF SDO 600). Next, a synchronization process is invoked based on ADF SDO 600, and a corresponding service data object is generated within a SOA layer of decomposition layer 620 (i.e., SOA SDO 601), where SOA SDO 601 is synchronized with ADF SDO 600. For example, a header object can be extended to include a new child object, a compliance detail object. The compliance detail object can comprise one or more extensible flex field segments, and thus, a corresponding service data object can be created within an ADF BC layer. When the newly generated ADF service data object is created, it can be synchronized with a corresponding SOA service data object. Thus, in SOA XML, a header object and a corresponding child object (i.e., the compliance detail object) is visible. The compliance detail object is empty at this point because no data attributes have been mapped to the compliance detail object.

According to the embodiment, after synchronization, the distributed order orchestration system has visibility to ADF SDO 600, which also means that a user of the distributed order orchestration system has visibility to ADF SDO 600 as well. Thus, subsequently, a user maps one or more attributes of an EBM 602 that is sent by order capture layer 610 to one or more attributes of ADF SDO 600. In certain embodiments, the user can perform this mapping using a user interface that is displayed by the distributed order orchestration system. In the above example, a user maps attributes of EBM 602 that carry the compliance detail data to attributes of the compliance detail object. Once the user has completed mapping attributes of EBM 602 to attributes of ADF SDO 600, the mappings are deployed as a customized composite (i.e., mapping 603). When EBM 602 is sent from order capture layer 610 to decomposition layer 620, mapping 603 facilitates the transfer of data contained in the mapped attributes of EMB 602 to SOA SDO 601, and subsequently to ADF SDO 600. In the above example, attributes of EBM 602 that carry the compliance detail data are transferred to SOA SDO 601, and subsequently to ADF SDO 600.

Subsequently, decomposition layer 620 performs processing previously described in relation to FIG. 1. As part of this processing, decomposition layer 620 can execute one or more rules stored in a rule dictionary (not shown). According to the embodiment, because the distributed order orchestration system has visibility to ADF SDO 600, any rule of the one or more rules that reference ADF SDO 600 can be executed on ADF SDO 600. Thus, the one or more rules also have visibility to ADF SDO 600. Once decomposition layer 620 has completed processing, all data, including data contained within ADF SDO 600 is stored in a database (not shown). In certain embodiments, the data contained in ADF SDO 600 that was originally sent by order capture layer 610 within EBM 602 can be displayed within a user interface of the distributed order orchestration system.

Subsequently, orchestration layer 630 performs processing previously described in relation to FIG. 1. As part of this processing, orchestration layer 630 can create ADF SDO 600, query the data that was originally sent by order capture layer 610 within EBM 602 and store the data within ADF SDO 600. In certain embodiments, the data can be queried by invoking an ADF BC service. Orchestration layer 630 can then perform processing on ADF SDO 600.

Subsequently, task layer 640 performs processing previously described in relation to FIG. 1. As part of this processing, task layer can create ADF SDO 600, query the data that was originally sent by order capture layer 610 within EBM 602 and store the data within ADF SDO 600. In certain embodiments, the data can be queried by invoking an ADF BC service. Task layer 640 can then perform processing on ADF SDO 600, and send ADF SDO 600 to external interface layer 650.

According to the embodiment, a user maps one or more attributes of ADF SDO 600 to one or more attributes of an EBM 604 that is sent by external interface layer 650 to fulfillment layer 660, where fulfillment layer 660 is configured to process EBM 604. In certain embodiments, the user can perform this mapping using a user interface that is displayed by the distributed order orchestration system. Once the user has completed mapping attributes of ADF SDO 600 to attributes of EBM 604, the mappings are deployed as a customized composite (i.e., mapping 605). When EBM 604 is sent from external interface layer 650 to fulfillment layer 660, mapping 605 facilitates the transfer of data contained in the mapped attributes of SOA SDO 601 to EBM 604, and subsequently to a fulfillment system within fulfillment layer 660. Thus, the fulfillment system within fulfillment layer 660 receives data associated with the external flex fields.

In certain embodiments, the fulfillment system within fulfillment layer 660 sends a response to the distributed order orchestration system, where the response includes data associated with the external flex fields. In these embodiments, a user maps one or more attributes of an EBM 606 that is sent by fulfillment layer 660 to one or more attributes of ADF SDO 609. Once the user has completed mapping attributes of EBM 606 to attributes of ADF SDO 609, the mappings are deployed as a customized composite (i.e., mapping 607). When EBM 606 is sent from fulfillment layer 660 to external interface layer 650, mapping 607 facilitates the transfer of data contained in the mapped attributes of EMB 606 to SOA SDO 608, and subsequently to ADF SDO 609. Subsequently, external interface 650, task layer 640, orchestration layer 630, and decomposition layer 620 perform processing as previously described. In certain embodiments, when an order line is split into multiple order lines, any extensible flex fields referenced in the original order line are copied onto newly created order lines during split processing.

Figure 7:
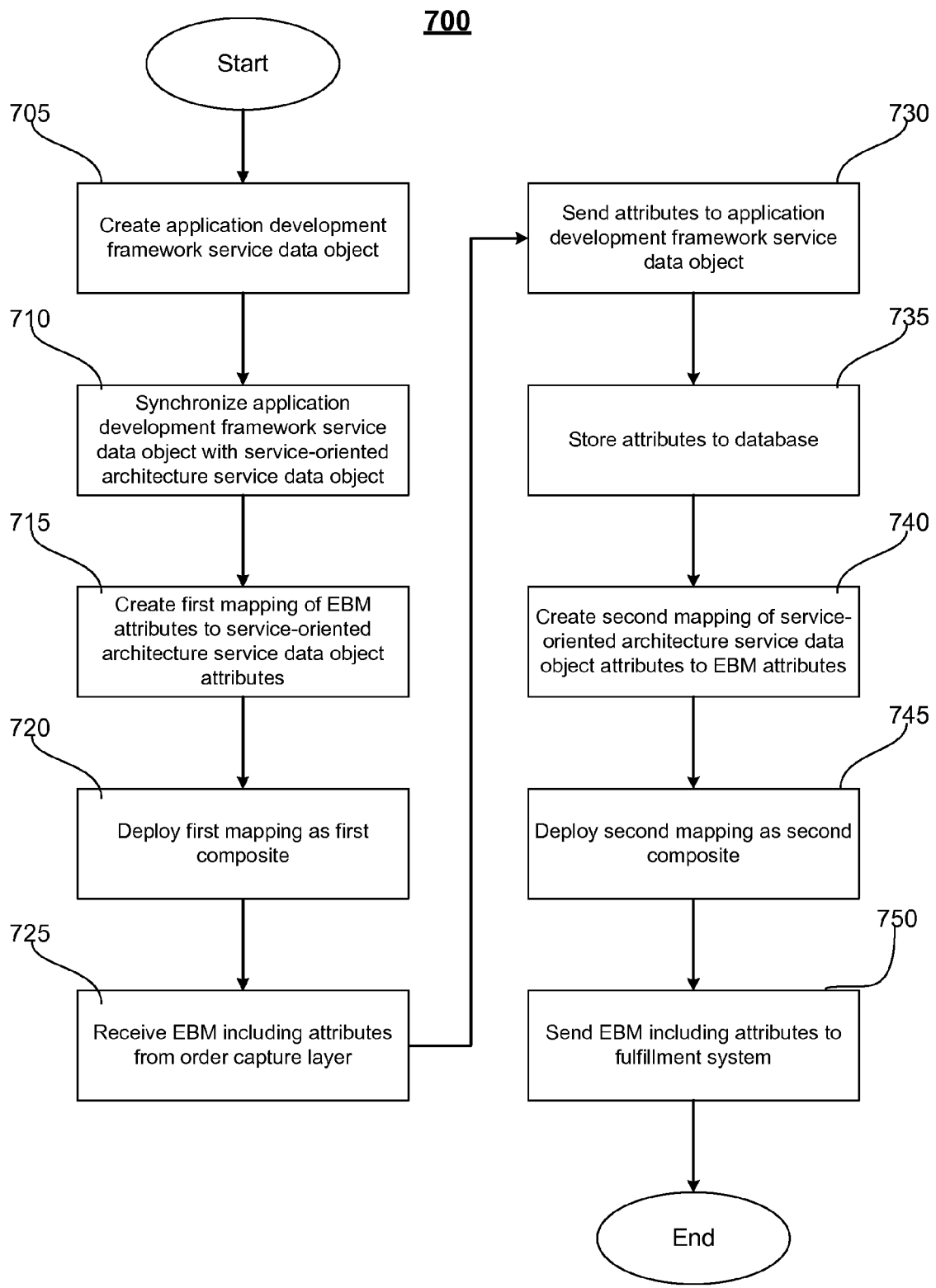
FIG. 7 illustrates a flow diagram of the functionality of an extensible data model module according to another embodiment of the invention.

FIG. 7 illustrates a flow diagram 700 of the functionality of an extensible data model module according to another embodiment of the invention. At 705, an application development framework service data object is created. According to the embodiment, the application development framework service data object is a service data object that is created within an application development framework layer that is associated with one or more extensible flex fields. At 710, the application development framework artifact is synchronized with a service-oriented architecture service data object. According to the embodiment, the application development framework service data object is synchronized with the service-oriented architecture service data object by invoking a computer program that generates the service-oriented architecture service data object and synchronizes the service-oriented architecture service data object with the application development framework service data object. At 715, a first mapping of one or more extensible flex field data attributes of a first EBM to one or more extensible flex field data attributes of the service-oriented architecture service data object is created. In certain embodiments, the mapping is created at a user interface that is displayed to a user. At 720, the first mapping is deployed as a first composite. According to the embodiment, the first composite can facilitate a transformation of a first EBM that includes one or more extensible flex field data attributes into a service-oriented architecture service data object that includes one or more extensible flex field data attributes. In one embodiment, this transformation includes transforming an XML format of the first EBM into an XML format of the service-oriented architecture service data object.

At 725, a first EBM is received from an order capture layer, where the first EBM includes one or more extensible flex field data attributes. According to the embodiment, the first EBM is transformed into a service-oriented architecture service data object using the first composite. At 730, the one or more extensible flex field data attributes of the service-oriented architecture service data object are sent to the application development framework service data object. At 735, the one or more extensible flex field data attributes are stored in a database. At 740, a second mapping of one or more extensible flex field data attributes of a service-oriented architecture service data object to one or more extensible flex field data attributes of a second EBM is created. In certain embodiments, the mapping is created at a user interface that is displayed to a user. At 745, the second mapping is deployed as a second composite. According to the embodiment, the second composite can facilitate a transformation of a service-oriented architecture artifact that includes one or more extensible flex field data attributes into a second EBM that includes one or more extensible flex field data attributes. In one embodiment, this transformation includes transforming an XML format of the service-oriented architecture artifact into an XML format of the second EBM. At 750, the second EBM, including the one or more extensible flex field data attributes, is sent to a fulfillment system within a fulfillment layer.

Figure 8:
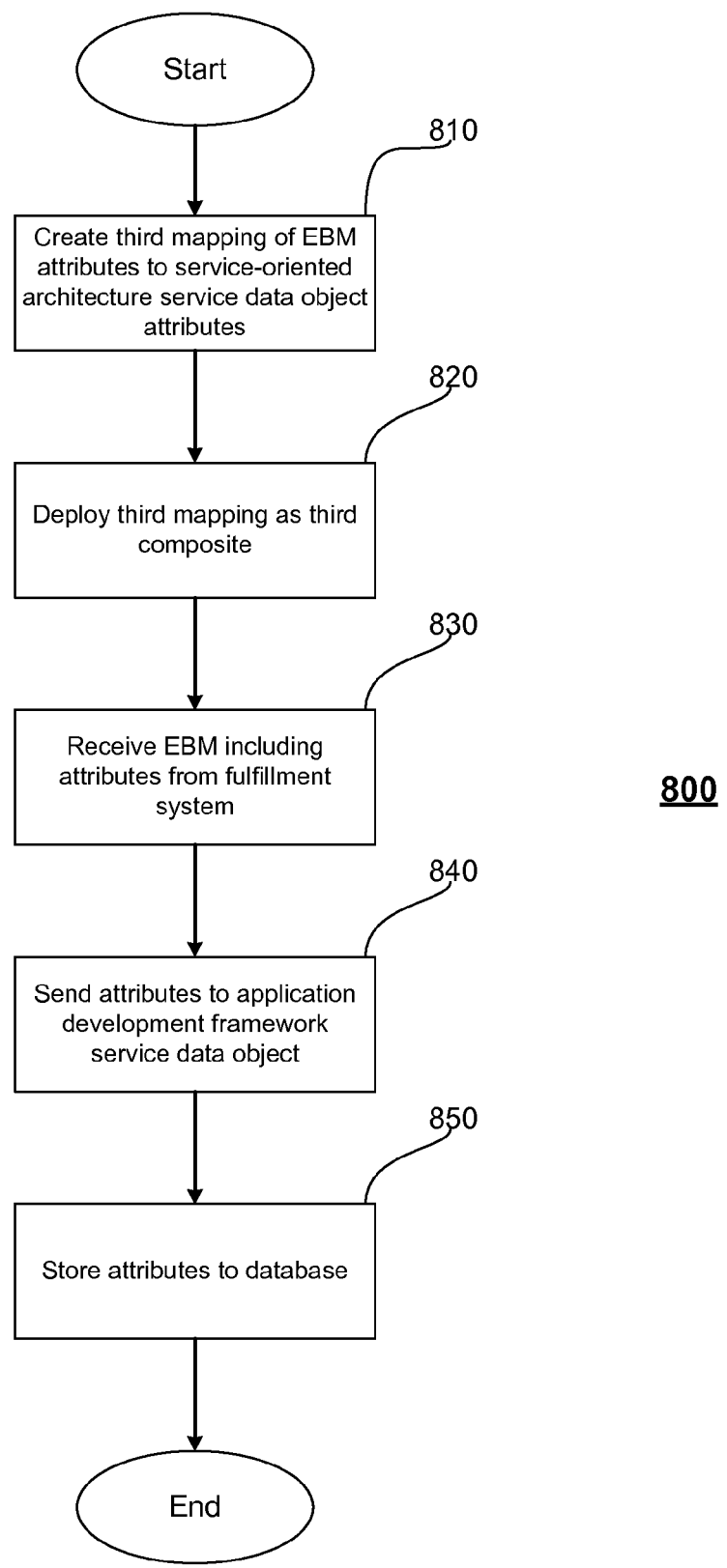
FIG. 8 illustrates a flow diagram of the functionality of an extensible data model module according to another embodiment of the invention.

FIG. 8 illustrates a flow diagram 800 of the functionality of an extensible data model module according to another embodiment of the invention. At 810, a third mapping of one or more extensible flex field data attributes of a third EBM to one or more extensible flex field data attributes of a service-oriented architecture service data object is created. In certain embodiments, the mapping is created at a user interface that is displayed to a user. At 820, the third mapping is deployed as a third composite. According to the embodiment, the third composite can facilitate a transformation of a third EBM that includes one or more extensible flex field data attributes into a service-oriented architecture service data object that includes one or more extensible flex field data attributes. In one embodiment, this transformation includes transforming an XML format of the third EBM into an XML format of the service-oriented architecture service data object.

At 830, a third EBM is received from a fulfillment system within a fulfillment layer, where the third EBM includes one or more extensible flex field data attributes. According to the embodiment, the third EBM is transformed into a service-oriented architecture service data object using the third composite. At 840, the one or more extensible flex field data attributes of the service-oriented architecture service data object are sent to the application development framework service data object. At 850, the one or more extensible flex field data attributes are stored in a database.

Thus, according to the embodiment, one or more extensible flex fields can be leveraged within a distributed order orchestration system. This leveraging can occur with minimal setup needed from a user who creates the one or more extensible flex fields. Thus, an extensible flex field framework can be utilized within a distributed order orchestration system and only require that the user provide mappings for the one or more extensible flex fields.

Rule Customization Preservation for Rule Dictionaries

One embodiment is directed to a distributed order orchestration system that creates a custom rule dictionary based on a base rule dictionary and a template rule dictionary. The custom rule dictionary stores at least one customized rule. A "software patch" is subsequently applied, which modifies the base rule dictionary and the template rule dictionary. The custom rule dictionary, including the at least one customized rule, is preserved, notwithstanding the application of the software patch. In other words, the custom rule dictionary is prevented from being modified by the software patch. A software patch is defined as any computer program that, when executed, modifies a fact and/or a rule of an application.

In previous systems, customized business rules for an application in a customer environment would generally get overwritten once a software patch was applied to the application in the customer environment. For example, in an application that included a rule dictionary, where the rule dictionary includes one or more customized rules, an application of a software patch would generally overwrite the customized rules stored within the rule dictionary. In general, there was no mechanism for preserving customized business rules within the application, while permitting the software patch to be applied to a data model of the application, in order to update the data model. Therefore, according to certain embodiments of the invention, a template rule dictionary can be used to create a custom rule dictionary at runtime of an application, where the custom dictionary is not overwritten by a software patch. Thus, any customized rules stored within the custom rule dictionary are preserved (i.e., prevented from being modified), notwithstanding the application of the software patch.

Figure 9:
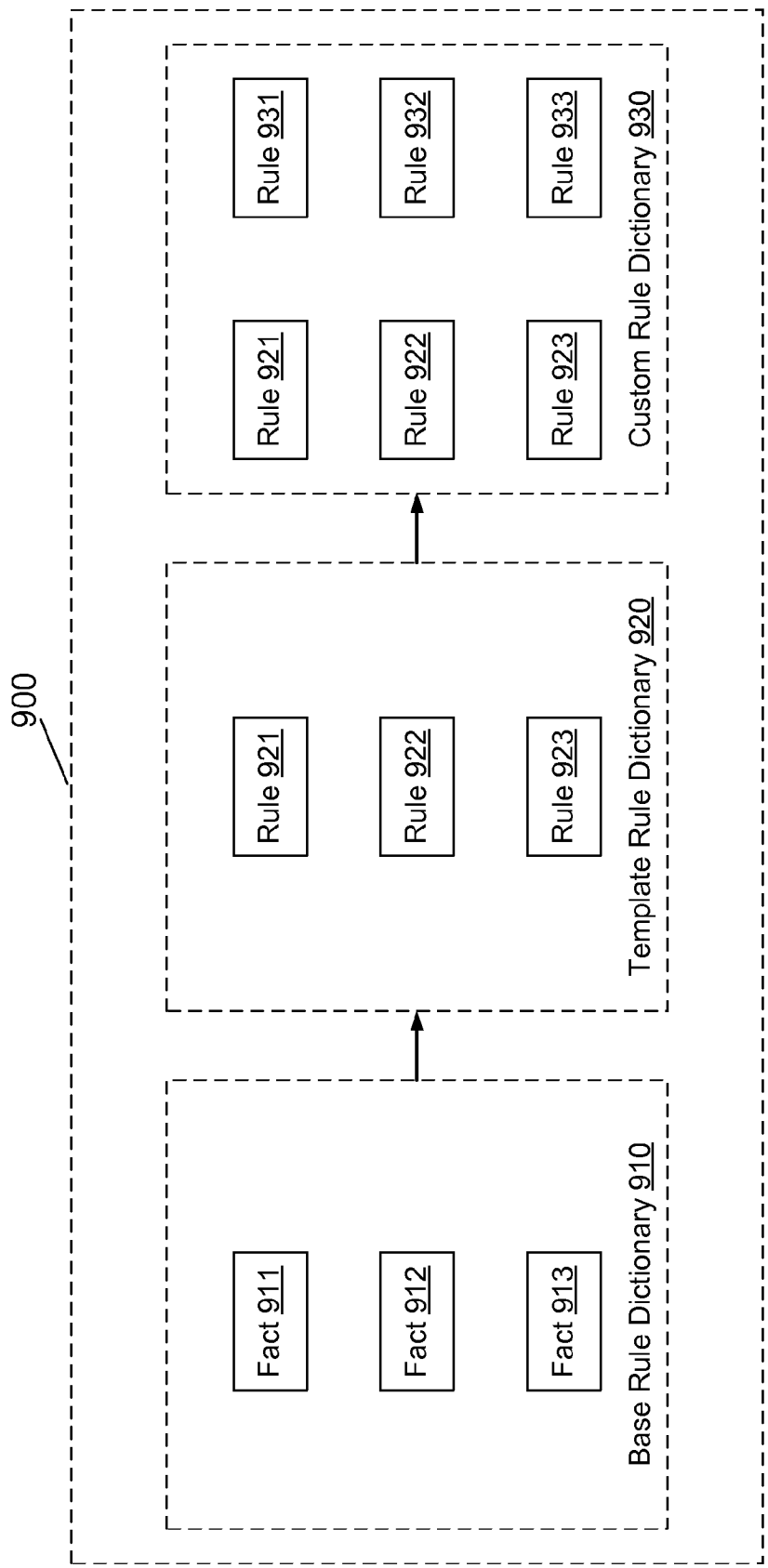
FIG. 9 illustrates a block diagram of an application that includes a base rule dictionary, a template rule dictionary, and a custom rule dictionary before a software patch has been applied to the application, according to an embodiment of the invention.

FIG. 9 illustrates a block diagram of an application 900 that includes a base rule dictionary 910, a template rule dictionary 920, and a custom rule dictionary 930 before a software patch has been applied to application 900, according to an embodiment of the invention. According to the embodiment, a base rule dictionary, such as base rule dictionary 910, can include any number of facts. In the illustrated embodiment of FIG. 9, base rule dictionary 910 includes facts 911, 912, and 913. However, this is merely an example embodiment, and in alternate embodiments, base rule dictionary 910 can include any number of facts.

Furthermore, according to the embodiment, a template rule dictionary, such as template rule dictionary 920 can be linked to a base rule dictionary. The template rule dictionary can include any number of rule sets, where each rule set can include any number of rules. Each rule of the template rule dictionary can be created at design time of application 900, and thus, can be seeded within the template rule dictionary when the application is executed in an environment, such as a customer environment. Furthermore, each rule of the template rule dictionary can reference one or more facts of the base rule dictionary that the template rule dictionary is linked to. In the illustrated embodiment of FIG. 9, template rule dictionary 920 is linked to base rule dictionary 910. Furthermore, in the illustrated embodiment, template rule dictionary 920 includes a rule set that includes rules 921, 922, and 923. However, this is merely an example embodiment, and in alternate embodiments, template rule dictionary 920 can include any number of rules. Furthermore, in the illustrated embodiment, each of rules 921, 922, and 923 can reference one or more facts of facts 911, 912, and 913 stored within base rule dictionary 910.

Furthermore, according to the embodiment, a custom rule dictionary, such as custom rule dictionary 930, can be created from a base rule dictionary and a template rule dictionary. Similar to the template rule dictionary, the custom rule dictionary can include any number of rule sets, where each rule set can include any number of rules. However, at least one rule of the custom rule dictionary can be a customized rule, which is a rule that is customized by a user of application 900 at run time. An example of a customized rule is a rule that is created at run time by the user (as opposed to a seeded rule that is created at design time). Another example of a customized rule is a seeded rule that is originally created at run time, but modified at design time by the user. According to certain embodiment, a rules editor user interface (not shown in FIG. 9) that is displayed by application 900 can be used by a user to customize a rule (i.e., either create a new rule or modify a seeded rule). In certain embodiments, a custom rule dictionary can be a copy of a template rule dictionary, with the only difference between the custom rule dictionary and the template rule dictionary being the inclusion of at least one customized rule. Thus, in these embodiments, when a user customizes a rule, the rules of a template rule dictionary are displayed to the user (for example, within a rules editor user interface). However, after a user customizes a rule, the template rule dictionary is saved as a custom rule dictionary including the customized rule. Subsequently, in these embodiments, when a user customizes a rule, the rules of the custom rule dictionary are displayed to the user, and any further rule customizations are saved within the custom rule dictionary. Thus, in these embodiments, a base rule dictionary and template rule dictionary are not modified when a rule is customized by a user. Therefore, when application 900 executed order processing, application 900 uses the custom rule dictionary, rather than the template rule dictionary or the base rule dictionary, to evaluate rules.

In the illustrated embodiment of FIG. 9, custom rule dictionary 930 is created from template rule dictionary 920, where template rule dictionary 920 is linked to base rule dictionary 910. Furthermore, in the illustrated embodiment, custom rule dictionary 930 includes rules that have been customized by a user (i.e., rules 921, 922, 923, 931, 932, and 933). More specifically, rules 921, 922, 923 have been modified by a user, and rules 931, 932, and 933 have been created by the user. However, this is merely an example embodiment, and in alternate embodiments, custom rule dictionary 930 can include any number of rules.

Figure 10:
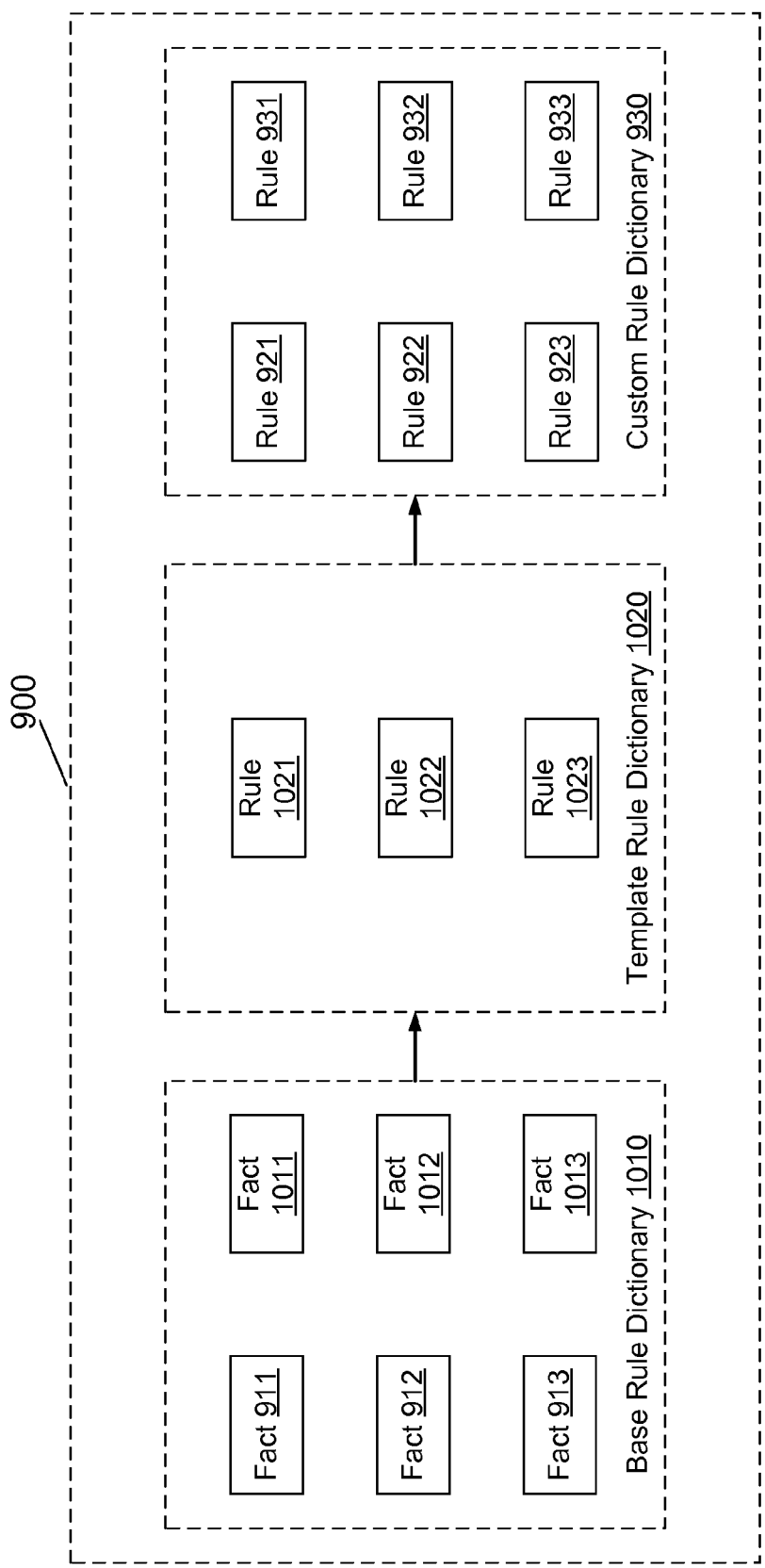
FIG. 10 illustrates a block diagram of an application that includes a base rule dictionary, a template rule dictionary, and a custom rule dictionary after a software patch has been applied to the application, according to an embodiment of the invention.

FIG. 10 illustrates a block diagram of application 900 that includes a base rule dictionary 1010, a template rule dictionary 1020, and custom rule dictionary 930 after a software patch has been applied to application 900, according to an embodiment of the invention. According to the embodiment, the software patch is applied to base rule dictionary 910 and template rule dictionary 920 of FIG. 9, thus, modifying base rule dictionary 910 and template rule dictionary 920 to create base rule dictionary 1010 and template rule dictionary 1020 of FIG. 10.

More specifically, in the illustrated embodiment, base rule dictionary 1010 includes new facts 1011, 1012, and 1013, in addition to pre-existing facts 911, 912, and 913. However, this is merely an example embodiment, and in alternate embodiments, a software patch can modify a base rule dictionary in any way, including, creating one or more new facts, modifying one or more pre-existing facts, or any combination therein.

Furthermore, in the illustrated embodiment, template rule dictionary 1020 includes rules 1021, 1022, and 1023, which are modified versions of rules 921, 922, and 923 of FIG. 9, respectively. However, this is merely an example embodiment, and in alternate embodiments, a software patch can modify a template rule dictionary in any way, including, creating one or more new rules, modifying one or more pre-existing rules, deleting one or more pre-existing rules, or any combination therein.

According to the embodiment, the software patch is not applied to custom rule dictionary 930 of FIG. 9. Instead, as illustrated in FIG. 10, custom rule dictionary 930 (including all of its customized rules) is preserved within application 900. In other words, custom rule dictionary 930, as well as all of its customized rules, is prevented from being modified by the software patch. Thus, as illustrated in FIG. 10, custom rule dictionary 930 includes rules 921, 922, 923, 931, 932, and 933. Furthermore, because custom rule dictionary 930 is created from base rule dictionary 910 and template rule dictionary 920, custom rule dictionary 930 can access any facts (including any new facts or modified pre-existing facts) stored within base rule dictionary 1010, and can access any rules (including any new rules or modified pre-existing rules) stored within template rule dictionary 1020. Thus, in the illustrated embodiment of FIG. 10, custom rule dictionary 930 can access any of facts 911, 912, 913, 1011, 1012, and 1013 stored within base rule dictionary 1010, and can access any of rules 1021, 1022, and 1023 stored within template rule dictionary 1020.

FIG. 11 illustrates a flow diagram 1100 of the functionality of an extensible data module according to another embodiment of the invention. At 1110, a base rule dictionary is created that includes one or more facts. At 1120, a template rule dictionary is created that is linked to the base rule dictionary and that includes one or more rules. At 1130, the template rule dictionary is modified. At 1140, the template rule dictionary is saved as a custom rule dictionary. At 1150, a software patch is applied, where the software patch modifies the base rule dictionary and the template rule dictionary. At 1160, the custom rule dictionary is prevented from being modified by the software patch.

Thus, according to an embodiment, a custom rule dictionary can preserve one or more customized rules, notwithstanding an application of a software patch that modifies a base rule dictionary and a template rule dictionary that a custom rule dictionary is created from. Thus, the embodiment can allow for software patching with minimal downtime to re-define or re-import customized rules. This allows administrators of a distributed order orchestration system to uptake a software patch without having to perform administrative steps to manually preserve the customized rules.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A computer-readable medium having instructions stored thereon that, when executed by a processor, cause the processor to leverage extensible flex fields within a distributed orchestration system, the instructions comprising:
creating a rule dictionary, wherein the rule dictionary comprises one or more facts, wherein each fact represents an object that is operated on by a rule;
creating one or more artifacts, wherein each artifact represents an extensible flex field object of the distributed order orchestration system;
publishing the one or more artifacts to a rule dictionary, wherein the rule dictionary comprises one or more rules;
importing the one or more artifacts within the rule dictionary as one or more new facts; and
creating a rule for the rule dictionary, wherein the rule references the one or more new facts.

2. The computer-readable medium of claim 1, wherein the object comprises an extensible flex field object.

3. The computer-readable medium of claim 1, wherein the one or more artifacts are published by an enterprise schedule service program.

4. The computer-readable medium of claim 3, wherein the enterprise schedule service program is invoked manually.

5. The computer-readable medium of claim 3, wherein the enterprise schedule service program is invoked automatically.

6. The computer-readable medium of claim 1, wherein the rule dictionary comprises a base rule dictionary, the instructions further comprising:
creating a template rule dictionary that is linked to the base rule dictionary and that comprises one or more rules;
modifying the template rule dictionary;
saving the template rule dictionary as a custom rule dictionary;
applying a software patch, wherein the software patch modifies the base rule dictionary and the custom rule dictionary; and
preventing the custom rule dictionary from being modified by the software patch.

7. The computer-readable medium of claim 6, wherein modify the template rule dictionary further comprises at least one of: creating a new rule, deleting a pre-existing rule, or modifying a pre-existing rule.

8. The computer-readable medium of claim 1, wherein at least one artifact of the one or more artifacts comprises an application development framework service data object, the instructions further comprising:
synchronizing the application development framework service data object with a service-oriented architecture service data object;
creating a first mapping of one or more attributes of a first enterprise business message to one or more attributes of the service-oriented architecture service data object;
deploying the first mapping as a first composite;
receiving the first enterprise business message that comprises the one or more attributes from an order capture layer;
sending the one or more attributes to the application development framework service data object; and
storing the one or more attributes to a database.

9. The computer-readable medium of claim 8, the instructions further comprising:
creating a second mapping of one or more attributes of the service-oriented architecture service data object to one or more attributes of a second enterprise business message;
deploying the second mapping as a second composite; and
sending the second enterprise business message that comprises the one or more attributes to a fulfillment system.

10. The computer-readable medium of claim 9, the instructions further comprising:
creating a third mapping of one or more attributes of a third enterprise business message to one or more attributes of the service-oriented architecture service data object;
deploying the third mapping as a third composite;
receiving the third enterprise business message that comprises the one or more attributes from the fulfillment system;
sending the one or more attributes to the application development framework service data object; and
storing the one or more attributes to a database.

11. A computer-implemented method for leveraging extensible flex fields within a distributed order orchestration system, the computer-implemented method comprising:
creating a rule dictionary, wherein the rule dictionary comprises one or more facts, wherein each fact represents an object that is operated on by a rule;

creating one or more artifacts, wherein each artifact represents an extensible flex field object of the distributed order orchestration system;

publishing the one or more artifacts to a rule dictionary, wherein the rule dictionary comprises one or more rules;

importing the one or more artifacts within the rule dictionary as one or more new facts; and creating a rule for the rule dictionary, wherein the rule references the one or more new facts.

12. The computer-implemented method of claim 11, wherein the rule dictionary comprises a base rule dictionary, the computer-implemented method further comprising:

creating a template rule dictionary that is linked to the base rule dictionary and that comprises one or more rules;

modifying the template rule dictionary;

saving the template rule dictionary as a custom rule;

applying a software patch, wherein the software patch modifies the base rule dictionary and the custom rule dictionary; and preventing the custom rule dictionary from being modified by the software patch.

13. The computer-implemented method of claim 11, wherein at least one artifact of the one or more artifacts comprises an application development framework service data object, the computer-implemented method further comprising:

synchronizing the application development framework service data object with a service-oriented architecture service data object;

creating a first mapping of one or more attributes of a first enterprise business message to one or more attributes of the service-oriented architecture service data object;

deploying the first mapping as a first composite;

receiving the first enterprise business message that comprises the one or more attributes from an order capture layer;

sending the one or more attributes to the application development framework service data object; and storing the one or more attributes to a database.

14. The computer-implemented method of claim 13, the computer-implemented method further comprising:

creating a second mapping of one or more attributes of the service-oriented architecture service data object to one or more attributes of a second enterprise business message;

deploying the second mapping as a second composite; and sending the second enterprise business message that comprises the one or more attributes to a fulfillment system.

15. The computer-implemented method of claim 14, the computer-implemented method further comprising:

creating a third mapping of one or more attributes of a third enterprise business message to one or more attributes of the service-oriented architecture service data object;

deploying the third mapping as a third composite;

receiving the third enterprise business message that comprises the one or more attributes from the fulfillment system;

sending the one or more attributes to the application development framework service data object; and storing the one or more attributes to a database.

16. A distributed order orchestration system, comprising:

a rule dictionary creation module configured to create a rule dictionary, wherein the rule dictionary comprises one or more facts, wherein each fact represents an object that is operated on by a rule;

an artifact creation module configured to create one or more artifacts, wherein each artifact represents an extensible flex field object of the distributed order orchestration system;

a rule dictionary publication module configured to publish the one or more artifacts to a rule dictionary, wherein the rule dictionary comprises one or more rules;

an artifact importer module configured to import the one or more artifacts within the rule dictionary as one or more new facts; and a rule creation module configured to create a rule for the rule dictionary, wherein the rule references the one or more new facts.

17. The distributed order orchestration system of claim 16, wherein the rule dictionary comprises a base rule dictionary, wherein the distributed order orchestration system is further configured to create a template rule dictionary that is linked to the base rule dictionary and that comprises one or more rules;

wherein the distributed order orchestration system is further configured to modify the template rule dictionary;

wherein the distributed order orchestration system is further configured to save the template rule dictionary as a custom rule dictionary;

wherein the distributed order orchestration system is further configured to apply a software patch, wherein the software patch modifies the base rule dictionary and the custom rule dictionary; and wherein the distributed order orchestration system is further configured to prevent the custom rule dictionary from being modified by the software patch.

18. The distributed order orchestration system of claim 16, wherein at least one artifact of the one or more artifacts comprises an application development framework service data object;

wherein the distributed order orchestration system is further configured to synchronize the application development framework service data object with a service-oriented architecture service data object;

wherein the distributed order orchestration system is further configured to create a first mapping of one or more attributes of a first enterprise business message to one or more attributes of the service-oriented architecture service data object;

wherein the distributed order orchestration system is further configured to deploy the first mapping as a first composite;

wherein the distributed order orchestration system is further configured to receive the first enterprise business message that comprises the one or more attributes from an order capture layer;

wherein the distributed order orchestration system is further configured to send the one or more attributes to the application development framework service data object; and wherein the distributed order orchestration system is further configured to store the one or more attributes to a database.

19. The distributed order orchestration system of claim 18, wherein the distributed order orchestration system is further configured to create a second mapping of one or more attributes of the service-oriented architecture service data object to one or more attributes of a second enterprise business message;

wherein the distributed order orchestration system is further configured to deploy the second mapping as a second composite; and wherein the distributed order orchestration system is further configured to send the second enterprise business message that comprises the one or more attributes to a fulfillment system.

20. The distributed order orchestration system of claim 19:

wherein the distributed order orchestration system is further configured to create a third mapping of one or more attributes of a third enterprise business message to one or more attributes of the service-oriented architecture service data object;

wherein the distributed order orchestration system is further configured to deploy the third mapping as a third composite;

wherein the distributed order orchestration system is further configured to receive the third enterprise business message that comprises the one or more attributes from the fulfillment system;

wherein the distributed order orchestration system is further configured to send the one or more attributes to the application development framework service data object; and wherein the distributed order orchestration system is further configured to store the one or more attributes to a database.

* * * * *

UNITED STATES PATENT AND TRADEMARK OFFICE
CERTIFICATE OF CORRECTION

PATENT NO. : 8,762,322 B2
APPLICATION NO. : 13/477591
DATED : June 24, 2014
INVENTOR(S) : Sridharan et al.

It is certified that error appears in the above-identified patent and that said Letters Patent is hereby corrected as shown below:

On title page 2, column 2, References Cited under Other Publications, line 4, delete "EEE" and insert -- IEEE --, therefor.

On title page 2, column 2, References Cited under Other Publications, line 21, delete "Mangement" and insert -- Management --, therefor.

Signed and Sealed this
Twenty-fourth Day of February, 2015

Michelle K. Lee
*Deputy Director of the United States Patent and Trademark Office*